(12) United States Patent
Yabuzaki

(10) Patent No.: US 9,036,383 B2
(45) Date of Patent: May 19, 2015

(54) POWER SUPPLY DEVICE CONTROL CIRCUIT

(71) Applicant: FUJI ELECTRIC CO., LTD., Kawasaki-shi (JP)

(72) Inventor: Jun Yabuzaki, Matsumoto (JP)

(73) Assignee: FUJI ELECTRIC CO., LTD. (JP)

( * ) Notice: Subject to any disclaimer, the term of this patent is extended or adjusted under 35 U.S.C. 154(b) by 85 days.

(21) Appl. No.: 14/023,619

(22) Filed: Sep. 11, 2013

(65) Prior Publication Data

US 2014/0078792 A1 Mar. 20, 2014

(30) Foreign Application Priority Data

Sep. 19, 2012 (JP) ................................ 2012-206301

(51) Int. Cl.
*H02M 1/32* (2007.01)
*H02M 3/335* (2006.01)

(52) U.S. Cl.
CPC ............ *H02M 1/32* (2013.01); *H02M 3/33507* (2013.01)

(58) Field of Classification Search
USPC ............................ 363/55–56.1; 323/282–285
See application file for complete search history.

(56) References Cited

U.S. PATENT DOCUMENTS

| | | | |
|---|---|---|---|
| 6,788,556 B2 * | 9/2004 | Hosotani et al. ............ | 363/21.15 |
| 7,099,163 B1 | 8/2006 | Ying | |
| 7,567,070 B2 | 7/2009 | Djenguerian et al. | |
| 7,592,790 B2 | 9/2009 | Yang | |
| 7,616,454 B2 | 11/2009 | Yang | |
| 7,616,461 B2 | 11/2009 | Yang et al. | |
| 7,952,893 B2 * | 5/2011 | Hiasa ......................... | 363/21.01 |
| 8,013,585 B2 * | 9/2011 | Yamada ........................ | 323/285 |
| 2007/0183171 A1 | 8/2007 | Niijima | |
| 2007/0291516 A1 | 12/2007 | Nakamura et al. | |
| 2008/0278134 A1 * | 11/2008 | Murata ......................... | 323/284 |
| 2008/0291700 A1 | 11/2008 | Huang et al. | |
| 2008/0291701 A1 | 11/2008 | Lin | |
| 2009/0021233 A1 | 1/2009 | Hsu | |
| 2014/0043867 A1 * | 2/2014 | Sugawara et al. .......... | 363/21.15 |

FOREIGN PATENT DOCUMENTS

| | | |
|---|---|---|
| JP | 04-299061 A | 10/1992 |
| JP | 05-308774 A | 11/1993 |
| JP | 05-344712 A | 12/1993 |
| JP | 2002-153047 A | 5/2002 |
| JP | 2005-184882 A | 7/2005 |
| JP | 2007-215253 A | 8/2007 |
| JP | 2008-005567 A | 1/2008 |
| JP | 2009-106038 A | 5/2009 |

* cited by examiner

*Primary Examiner* — Jessica Han

(74) *Attorney, Agent, or Firm* — Rossi, Kimms & McDowell LLP

(57) ABSTRACT

In some aspects of the invention, overcurrent protection is carried out by suppressing fluctuations in current flowing through a switching element after overcurrent detection. A peak current reaching time detection circuit detects a peak current reaching time needed until current flowing through a switching element reaches a peak value. A difference voltage detection circuit, including a ½ time detection circuit which detects a time of ½ an ON time of the preceding cycle of the switching element, detects difference voltage between reference voltage used when detecting overcurrent flowing to a load and a signal which has detected current flowing through the switching element for the ½ time. A delay time adjustment circuit, based on at least one of the peak current reaching time and difference voltage, carries out adjustment and control of a delay time occurring until the time when the switching element is turned off after detecting the overcurrent.

6 Claims, 18 Drawing Sheets

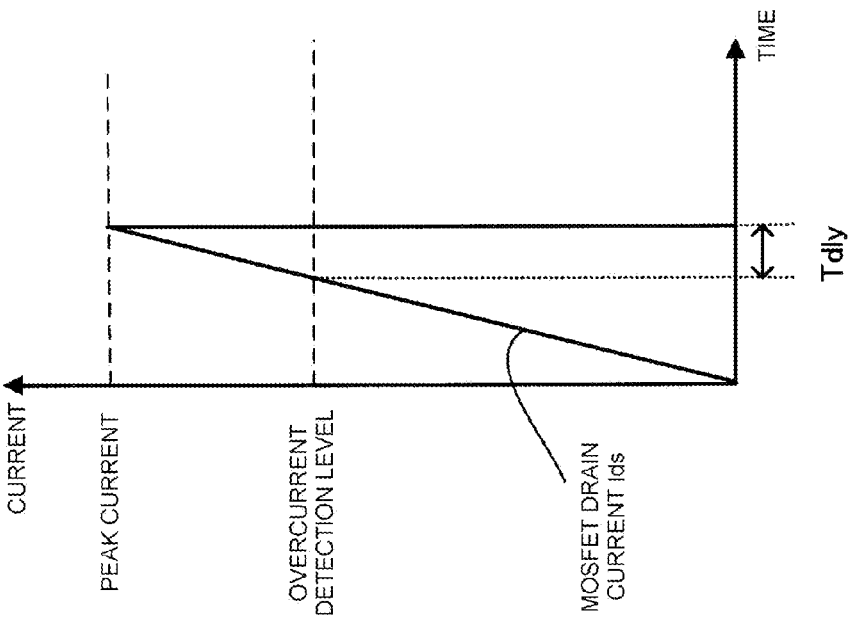
FIG. 4B  WHEN AC INPUT VOLTAGE IS HIGH
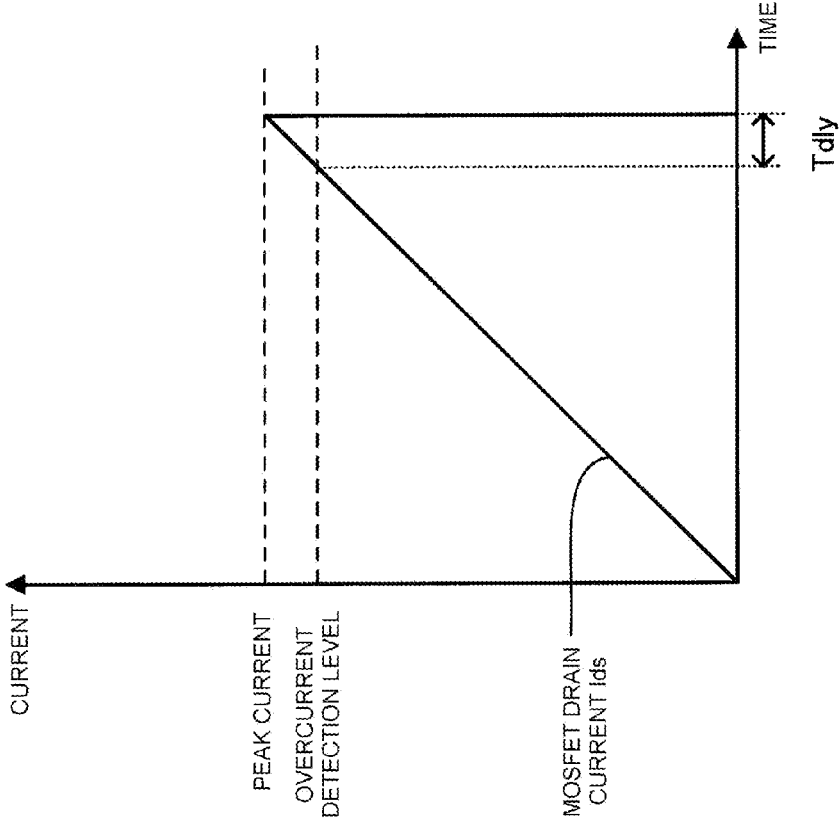
FIG. 4A  WHEN AC INPUT VOLTAGE IS LOW FIG. 8
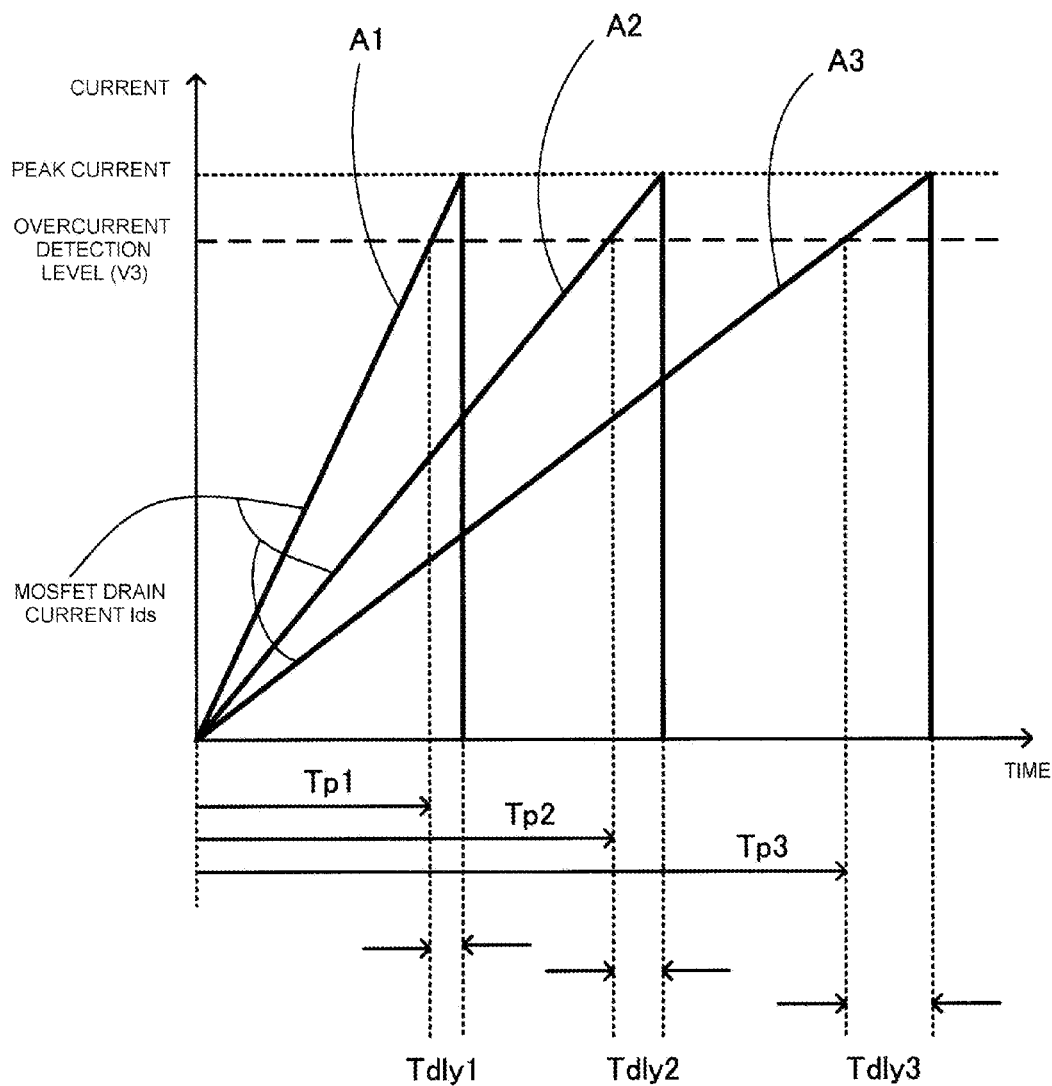
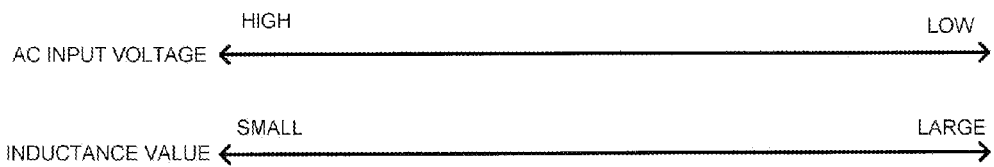

POWER SUPPLY DEVICE CONTROL CIRCUIT

BACKGROUND OF THE INVENTION

1. Field of the Invention

Embodiments of the invention relate to power supply device control circuits and, in particular, power supply device control circuits that include overcurrent protection.

2. Description of the Background

An alternate current (AC)/direct current (DC) converter of a switching power supply is a circuit which converts AC voltage into DC voltage, and as a circuit system, a flyback is widely adopted.

The flyback AC/DC converter, including a flyback converter including a transformer and a switching transistor (for example, an MOSFET: a metal oxide semiconductor field effect transistor), uses the flyback converter to obtain desired DC voltage from voltage wherein AC voltage is rectified by a diode bridge.

Additionally, a control integrated circuit (IC) for carrying out a stable supply of output voltage also against a factor, such as fluctuations in AC input voltage or load, or a change in temperature, is included in this kind of AC/DC converter.

The control IC, being disposed on the primary side of a transformer in the flyback converter, feedback controls the switching of the MOSFET based on information of output voltage on the secondary side of the transformer, thereby maintaining the output voltage constant.

Meanwhile, when a load connected on the output side of the AC/DC converter becomes larger or short-circuits, there is fear that current flowing through the MOSFET or transformer in the flyback converter becomes larger, thus leading to breakage of an element.

Because of this, the control IC includes an overcurrent protection (OCP) function which protects the circuit in such a way that output current equal to or more than a specified value does not flow by limiting current flowing through the MOSFET.

As a heretofore known technology of the OCP function, there is proposed a technology wherein a peak current is made constant by level shifting the triangular wave of an oscillator and taking it as the reference voltage of the OCP function, and thereby making the reference voltage high at low input voltage and making the reference voltage low at high input voltage. See, for example, U.S. Patent Application Publication No. 2008/0291700. Also, there is proposed a technology wherein AC input voltage is detected, and the reference voltage of the OCP function is changed in accordance with the detected AC input voltage. See, for example, Japanese patent application publication no. JP-A-2002-153047.

The OCP function limits the peak current of a switching element (for example, MOSFET, hereafter referred to simply also as MOSFET on behalf of the switching element) disposed on the primary side of the transformer. Specifically, the control IC compares voltage proportional to current flowing through the MOSFET and the reference voltage, recognizes that overcurrent is generated when it detects a voltage exceeding the reference voltage, and carries out the control of stopping the switching of the MOSFET.

In this case, delay occurs until the time when the control IC actually stops the switching of the MOSFET after it has detected the overcurrent. Therefore, even when the overcurrent is detected, the switching does not stop instantaneously, and the overcurrent flows for a delay time.

Meanwhile, a change occurs in the slope of the rise of drain current flowing through the MOSFET due to a change in the AC input voltage, and the slope of the drain current is gentle when the AC input voltage is low, while the slope of the drain current is steep when the AC input voltage is high. This is due to the inductance of the transformer through which the drain current flows.

Herein, for example, when the reference voltage of the OCP function is at a constant level, a difference occurs between the maximum value (a peak current) of drain current flowing in a delay time zone in which the OCP functions when the slope of the drain current is gentle and the maximum value of drain current flowing in a delay time zone in which the OCR functions when the slope of the drain current is steep.

In this way, as a difference occurs in the drain current flowing in the delay time zone in which the OCP function works due to a change in the AC input voltage, the heretofore known technologies heretofore described (see, for example, U.S. Patent Application Publication No. 2008/0291700 and Japanese patent application publication no. JP-A-2002-153047) adopt a configuration wherein the reference voltage is also adaptively changed based on the change in the AC input voltage, thus making the peak current constant.

However, the slope of the rise of the drain current of the MOSFET also changes due to a change in the inductance value of the primary winding of the transformer in the flyback converter. Because of this, the peak current cannot maintain a constant value depending on a transformer used.

With the heretofore known technologies heretofore described, a shift of the peak current due to the change in the inductance value on the primary side of the transformer cannot be coped with, and there is a problem that it is difficult to realize an OCP function which is always stable.

SUMMARY OF THE INVENTION

Embodiments of the invention address the above-discussed needs and other needs in the related art. Embodiments of the invention provide a power supply device control circuit which carries out stable overcurrent protection by suppressing fluctuations in current flowing through a switching element.

In some embodiments, there is provided a power supply device control circuit which, based on turning-on/turning-off of a switching element, converts rectified alternating current input voltage into direct current output voltage, and supplies it to a load. The power supply device control circuit includes a peak current reaching time detection circuit which detects a peak current reaching time needed until current flowing through the switching element reaches a peak value; a difference voltage detection circuit, including an A time detection circuit which detects an A time which is A (0<A<1 times as long as an ON time of the preceding cycle of the switching element, which detects difference voltage between reference voltage used when detecting overcurrent flowing to the load and a value for the A time of a current signal which has detected current flowing through the switching element; and a delay time adjustment circuit which, based on at least one of the peak current reaching time and difference voltage, carries out adjustment and control of a delay time occurring until the time when the switching element is turned off after detecting the overcurrent.

Thus, in some embodiments, it is possible to carry out stable overcurrent protection by suppressing fluctuations in peak current flowing through the switching element.

BRIEF DESCRIPTION OF THE DRAWINGS

FIGS. 4A and 4B are diagrams showing a difference in the peak current when AC input voltage changes;

FIG. 8 is a diagram for illustrating an operation of a first embodiment of the invention;

DETAILED DESCRIPTION

Figure 1:
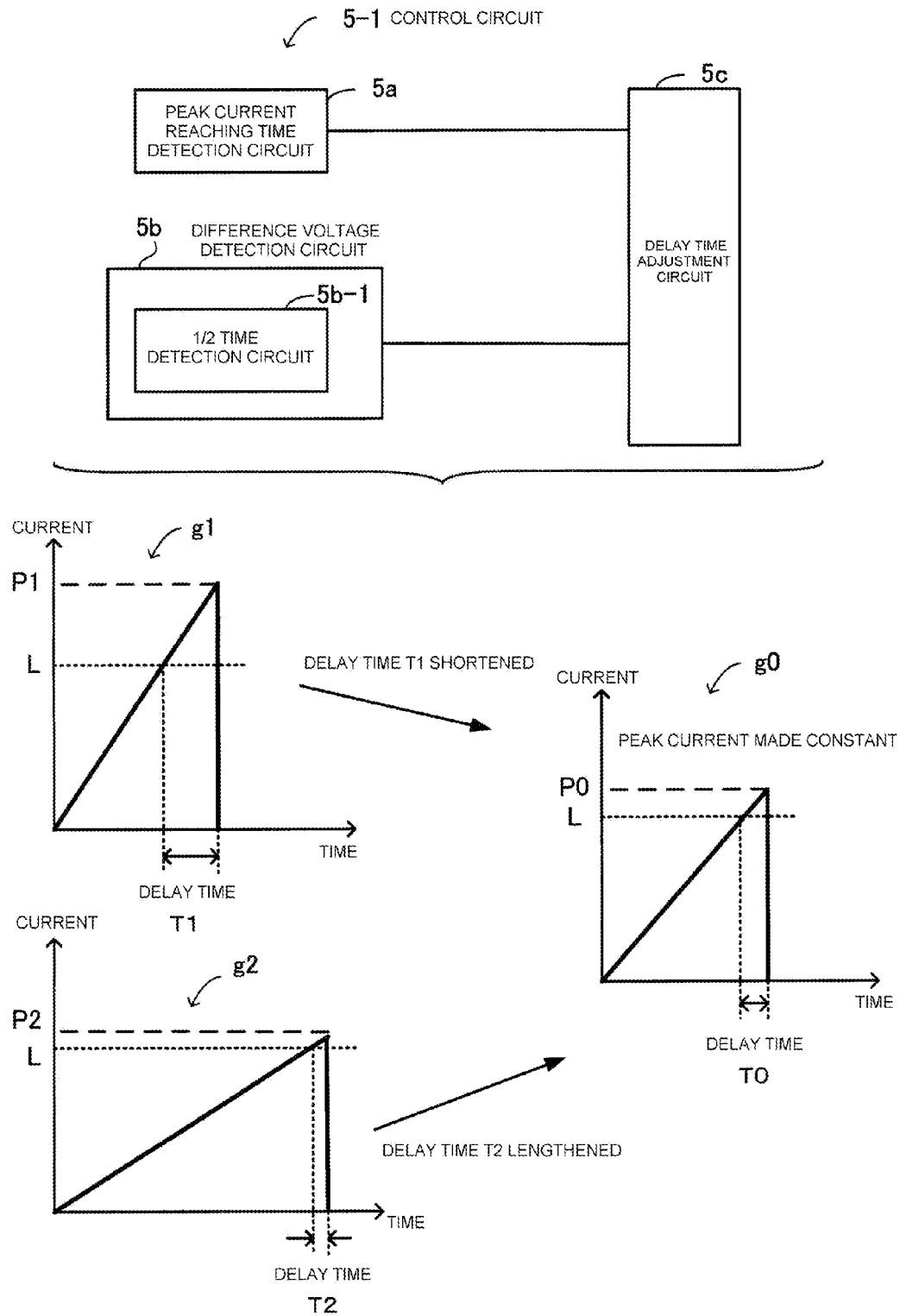
FIG. 1 is a diagram showing an example of a configuration of a power supply device control circuit.

Hereafter, a description will be given, referring to the drawings, of embodiments. FIG. 1 is a diagram showing an example of a configuration of a power supply device control circuit. A power supply device control circuit 5-1 is included in a power supply device which, based on turning-on/turning-off of a switching element, converts rectified alternating current input voltage into direct current output voltage and supplies it to a load.

The control circuit 5-1 has a peak current reaching time detection circuit 5a, a difference voltage detection circuit 5b, and a delay time adjustment circuit 5c. The difference voltage detection circuit 5b includes a ½ time detection circuit 5b-1.

The peak current reaching time detection circuit 5a generates, for example, a signal proportional to an ON time of the preceding cycle of the switching element as a signal representing a peak current reaching time needed until current flowing through the switching element reaches a peak value. The difference voltage detection circuit 5b, including the ½ time detection circuit 5b-1 which, based on the signal, detects a time of ½ the ON time of the preceding cycle of the switching element, detects the difference voltage between reference voltage used when detecting overcurrent flowing to the load and a signal which has detected current flowing through the switching element for the ½ time.

In the invention, it is sufficient that the ½ time detection circuit, in principle, detects a time A times (0<A<1) as long as the ON time of the preceding cycle (in this case, it is more appropriate to call the ½ time detection circuit an A time detection circuit), but hereafter, a description will be given mainly of an embodiment wherein A=½.

The delay time adjustment circuit 5c, based on at least one of the peak current reaching time and difference voltage, carries out the adjustment and control of a delay time occurring until the time when the switching element is turned off after the overcurrent has been detected.

Herein, graphs g0 to g2 shown in FIG. 1 show drain current flowing through the switching element from the OCP function of the control circuit 5-1 working to detect the overcurrent until the switching element is turned off, wherein the vertical axis is current, and the horizontal axis is time. Also, the graphs show the peak current of the switching element when an overcurrent detection level L (corresponding to the reference voltage) of the OCP function is a constant level.

In the graph g1, the peak current is P1 with respect to a delay time T1. In the graph g2, the peak current is P2 with respect to a delay time T2.

In this case, the delay time T1 in the graph g1 is shortened to a delay time T0, as shown in the graph g0, and the drain current is retrained from increasing, thus setting a peak current P0. Also, the delay time T2 in the graph g2 is lengthened to the delay time T0, as shown in the graph g0, and the drain current is more increased, thus setting the peak current P0 (P2<P0<P1).

In this way, the control circuit 5-1 is configured so as to make the peak current constant by adjusting and controlling the delay time. By so doing, it is possible to cope with not only a change in AC input voltage, but also a change in the inductance value of the primary winding of a transformer, and it is possible to carry out stable overcurrent protection by suppressing fluctuations in current flowing through the switching element.

Figure 2:
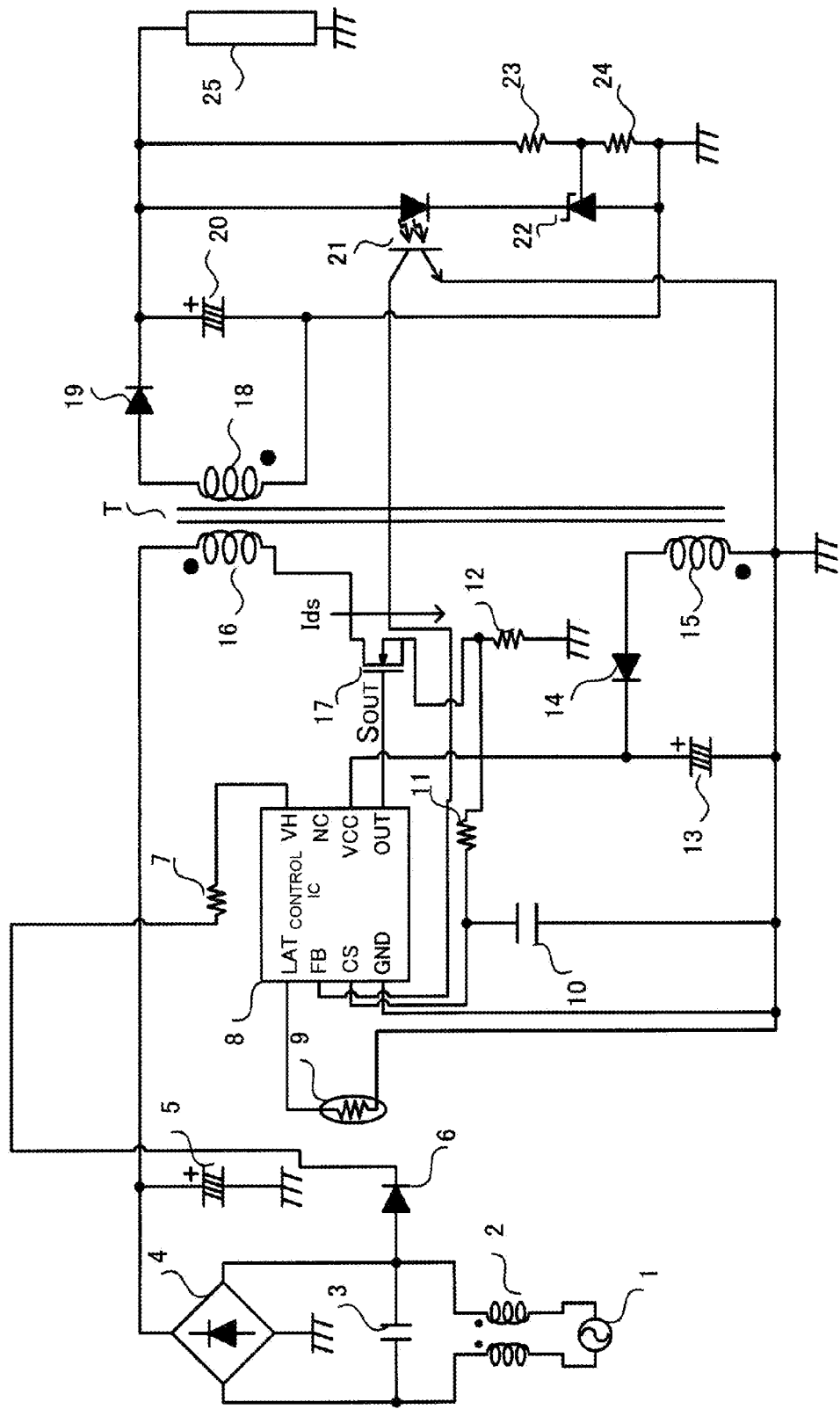
FIG. 2 is a diagram showing an example of a circuit configuration of a switching power supply device.

Next, a detailed description will be given, using FIGS. 2 to 6, of problems which the present technology is to solve. FIG. 2 is a diagram showing an example of a circuit configuration of a switching power supply device. FIG. 2 shows a flyback switching power supply device 100, which has a control IC 8 for pulse width modulation (PWM) control. A flyback converter includes at least a transformer T, diode 19, capacitor 20, and MOSFET 17 in FIG. 2.

AC input 1 is supplied to a diode bridge 4 via a transformer 2 and a capacitor 3 configuring an input filter, and rectified into direct current input voltage.

A capacitor 5, being provided between the diode bridge 4 and the ground, has the function of absorbing switching noise. Also, a diode 6 supplies the half-wave rectified AC input 1 to a VH terminal of the control IC 8 via a current limiting resistor 7. Input current supplied to the VH terminal is limited by the current limiting resistor 7.

A thermistor 9 for providing the control IC 8 with heating latch protection is connected to an LAT terminal of the control IC 8. Also, the voltage of a sense resistor 12 is input into a CS terminal of the control IC 8 via a noise filter formed of a capacitor 10 and resistor 11.

A VCC terminal of the control IC 8, as well as being connected to one end of a capacitor 13, is connected to an auxiliary winding 15 of the transformer T via a backflow prevention diode 14.

The capacitor 13 holds power supply voltage supplied to the control IC 8 when the PWM control operates. Also, the backflow prevention diode 14 acts so as to prevent the backflow of current from the VCC terminal to the auxiliary winding 15.

One end of a primary winding 16 of the transformer T is connected to the capacitor 5, and the other end is connected to the drain terminal of the MOSFET 17. Also, the source terminal of the MOSFET 17 is grounded via the sense resistor 12, and drain current ids flowing through the MOSFET 17 is detected by the sense resistor 12.

That is, in the sense resistor 2, the ON current of the MOSFET 17 is converted into a voltage signal proportional to the ON current, and the voltage signal (a current detection signal) is supplied to the CS terminal of the control IC 8 via the noise filter.

One end of a secondary winding 18 of the transformer T is connected to the diode 19, and furthermore, grounded via the capacitor 20. The voltage of the capacitor 20 is sent to the primary side from the secondary side by a photocoupler 21 as information relating to the output voltage supplied to a load 25.

The photocoupler 21 is connected in series to a shunt regulator 22, the connection point of resistors 23 and 24 which divide the output voltage is connected to the shunt regulator 22, and the value of the divided output voltage and unshown reference voltage are compared by the shunt regulator 22.

As a result of this, error information of the secondary side output voltage relative to the reference voltage is converted into a current signal, and load information is sent to the primary side by the current signal driving the photocoupler 21.

In the switching power supply device 100 configured using the control IC 8 for PWM control, the rectified AC input voltage is converted into predetermined DC voltage via the transformer T by controlling the switching operation of the MOSFET 17.

In the control IC 8 configured of an IC circuit, the load information output to the load 25 on the secondary side of the transformer T is detected by being fed back to an FB terminal of the control IC 8 via the shunt regulator 22 and photocoupler 21, as heretofore described.

Also, the drain current of the MOSFET 17 is converted into voltage by the sense resistor 12, and the voltage is detected at the CS terminal of the control IC 8. By comparing the voltage of the FB terminal and the voltage of the CS terminal, and variable controlling the ON width of the MOSFET 17 from an OUT terminal, it is possible to PWM control the switching power supply, and thereby possible to adjust power supplied to the secondary side load 25.

Herein, the OCP function of the control IC 8 is designed so that the voltage detected at the CS terminal and the reference voltage inside the control IC 8 are compared by a comparator in the control IC 8, and the switching of the MOSFET 17 is stopped when the voltage of the CS terminal becomes equal to or higher than a reference voltage. However, the delay time occurs until the time when the MOSFET 17 actually stops the switching after the CS terminal voltage has been above the reference voltage.

Figure 3:
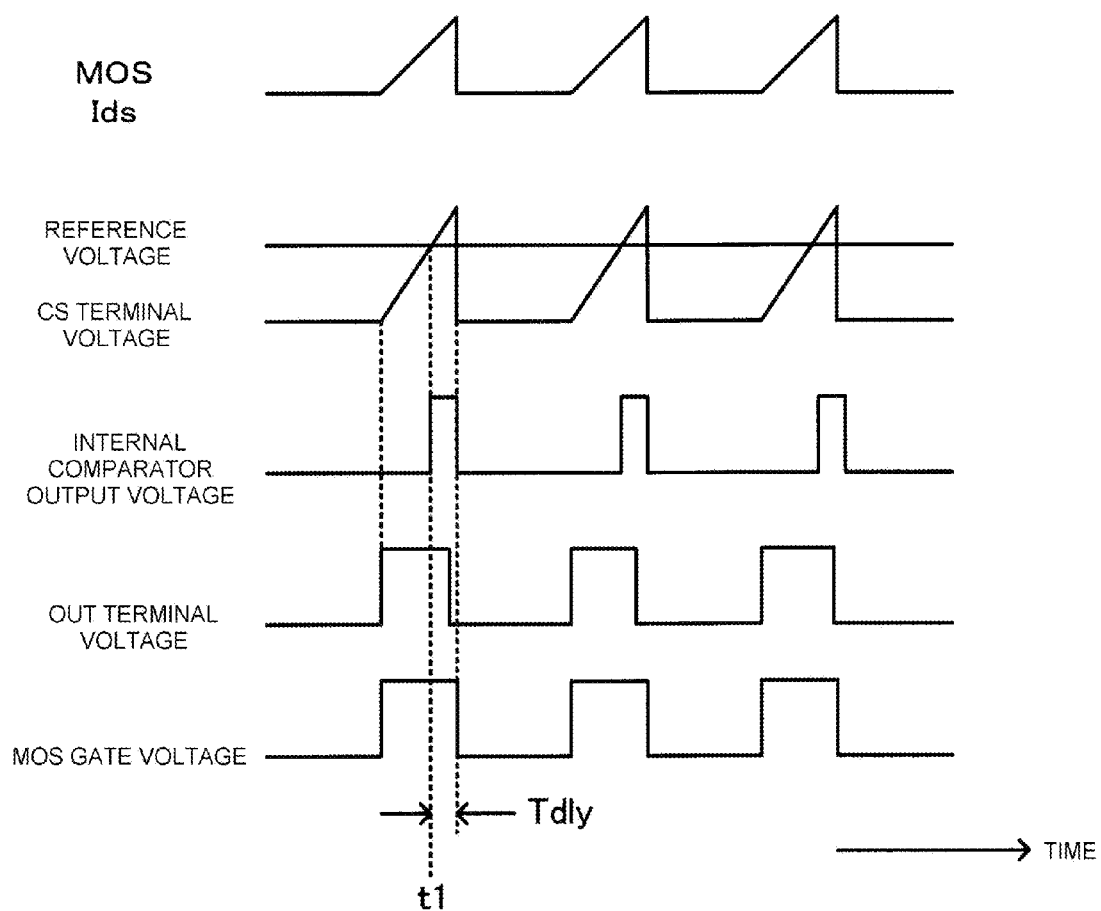
FIG. 3 is a diagram showing timing charts when OCP operates.

FIG. 3 is a diagram showing timing charts when OCP operates. The timing charts show a relationship between drain current Ids (MOS Ids) of the MOSFET 17, the reference voltage, the voltage of the CS terminal, the output voltage of the internal comparator, the voltage of the OUT terminal, and the gate voltage of the MOSFET 17.

As shown in FIG. 3, the gate voltage of the MOSFET 17 has not been turned off (has not reached voltage indicating OFF) yet at a time t1 at which the voltage of the CS terminal exceeds the reference voltage, but the gate voltage of the MOSFET 17 is turned off after a delay time Tdly, and the switching is stopped.

Propagation delay due to the heretofore shown noise filter connected to the CS terminal, propagation delay due to the internal circuits of the control IC 8, operating delay of the MOSFET 17, or the like, is the cause of a major delay factor for this kind of delay time occurring.

Also, when this kind of delay time occurs, there is a problem that the peak current flowing through the MOSFET 17 changes in accordance with operating conditions. This is because, for example, when the AC input voltage changes, as heretofore described, the slope of current flowing through the primary side winding 16 of the transformer T changes, and the slope of the current increases when the AC input voltage is high, while the slope of the current decreases when the AC input voltage lowers, so that a difference occurs in the slope of the current during the delay time.

FIGS. 4A and 4B are diagrams showing a difference of the peak current when the AC input voltage changes. The vertical axis is current, and the horizontal axis is time. Also, FIG. 4A shows a case in which the AC input voltage is low, and FIG. 4B shows a case in which the AC input voltage is high, each showing a difference of the peak current in each delay time zone.

The MOSFET 17 is turned off after the drain current Ids flowing when the MOSFET 17 is turned on has reached an overcurrent detection level (CS terminal voltage at this time is corresponding to the reference voltage), but a certain delay time Tdly is needed, as shown in FIG. 4A, until the drain current Ids is actually turned off.

Also, in the event that the AC input voltage from the AC input 1 is higher than in FIG. 4A, as shown in FIG. 4B, the slope of current flowing through the primary winding 16 of the transformer T when the MOSFET 17 is turned on increases.

The angle of the slope depends on the inductor value of the primary winding 16, but the slope is gentle when the AC input voltage is low, and the slope is steep when the AC input voltage is high.

Herein, the reference voltage for detecting overcurrent in the internal comparator of the control IC 8 is set to a constant value. Because of this, inductance current (=Ids) flows while rising for the delay time Tdly, the peak current in case MOSFET 17 turns off becomes so high that the input voltage from the AC input 1 is high.

Also, as the peak current set in the load 25 is determined, in general, by the overcurrent detection level when the AC input voltage is low, current becomes larger than an overcurrent detection level desired by the designer when the AC input voltage is high.

Consequently, in a heretofore known flyback power supply which is PWM controlled, the rated current of the MOSFET 17, transformer T, or the like, is made higher, which is a cause leading to an increase in the cost and size of the power supply device.

Meanwhile, in order to suppress this kind of phenomenon, the peak current is made constant by adaptively changing the overcurrent detection level in the heretofore described kinds of heretofore known technologies (U.S. Patent Application No. 2008/0291700 and JP-A-2002-153047).

Figure 5:
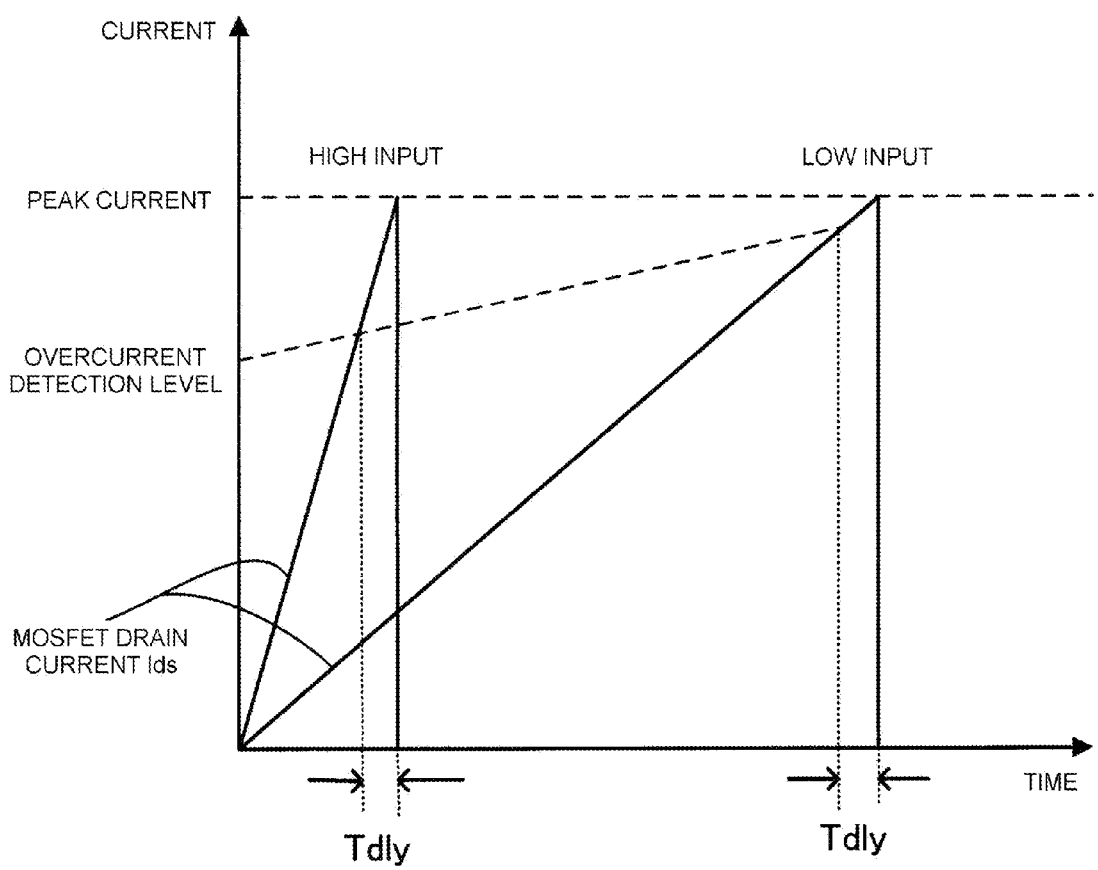
FIG. 5 is a diagram showing a condition in which an overcurrent detection level is changed in accordance with the length of an ON time of a switching element.

FIG. 5 is a diagram showing a condition in which the overcurrent detection level is changed in accordance with the length of the ON time of the switching element. The vertical axis is current, and the horizontal axis is time.

In the event that other conditions are the same, the higher the AC input voltage, the shorter the ON time of the switching element, when the drain current ids reaches overcurrent detection level is short ON time, the control IC 8 judges that the AC input voltage is high, and the overcurrent detection level becomes lower. By continuously changing the overcurrent detection level in accordance with the length of the ON time of the switching element in this way, it is possible to make the peak current of overcurrent protection of the MOSFET 17 constant without depending on the AC input voltage. However, with this kind of method in the heretofore known technologies, there has been a problem that it is not possible to make the peak current of the MOSFET 17 constant when the inductance value of the transformer primary winding changes.

Figure 6:
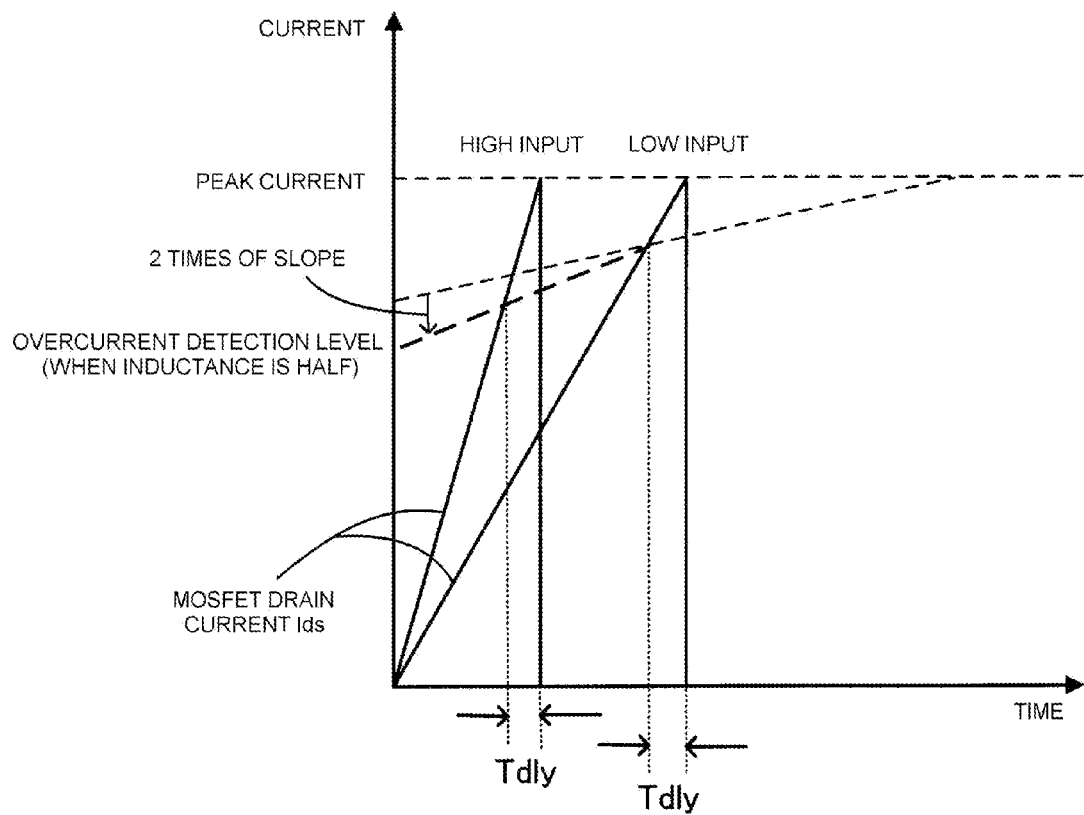
FIG. 6 is a diagram showing an overcurrent detection level when an inductance value changes.

FIG. 6 is a diagram showing an overcurrent detection level when the inductance value changes. When the inductance value is reduced to ½, it is necessary to double the slope of overcurrent detection level.

In this way, as the optimum overcurrent detection level also changes when the inductance value of the transformer primary winding changes, it is not possible to make the peak current of the MOSFET 17 constant. Because of this, there has been a problem that it is not possible to make the peak current constant depending on a transformer used.

The present technology, having been contrived bearing in mind these kinds of points, provides a power supply device control circuit which, without being affected by a transformer used, carries out stable overcurrent protection by suppressing fluctuations in current flowing through a switching element and making a peak current constant.

Next, a detailed description will hereafter be given of the present technology. A first embodiment of the present technology is such that a peak current reaching time (hereafter called a time Tp) needed until the drain current of the MOSFET 17 reaches a peak value is detected, and the delay time Tdly is adjusted based on the parameters of the detected time Tp.

Also, a second embodiment of the present technology is such that the delay time Tdly is adjusted based on the parameters of difference voltage between reference voltage when detecting overcurrent flowing to the load and the reference voltage for a time of ½ the ON time of the preceding cycle of the switching of the MOSFET 17.

Figure 7:
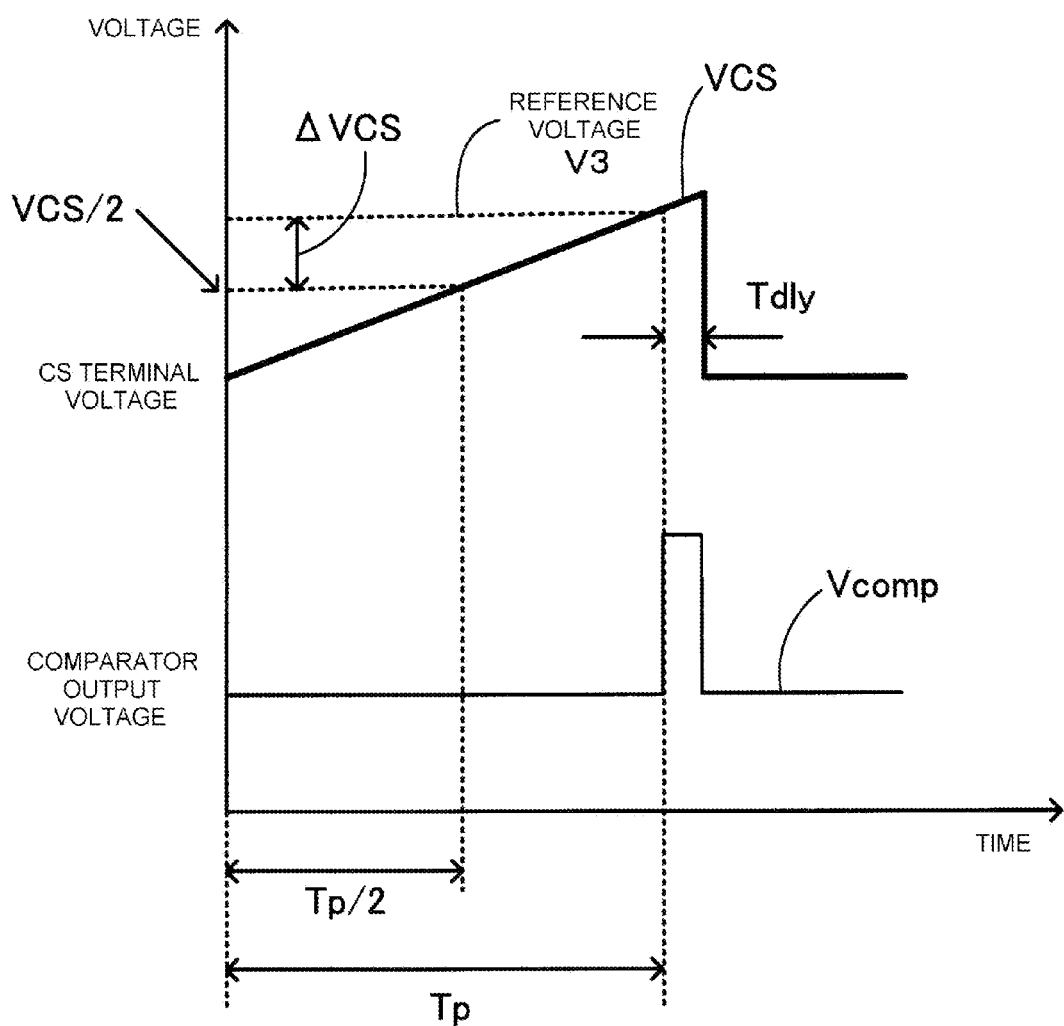
FIG. 7 is a diagram for illustrating the definition of certain parameters.

FIG. 7 is a diagram for illustrating a definition of each parameter. The vertical axis is voltage, and the horizontal axis is time. CS terminal voltage VCS, being voltage detected at the CS terminal of the control IC, is a voltage signal proportional to drain current flowing when the MOSFET 17 is turned on.

Reference voltage Vr is a voltage level for detecting overcurrent generated in the control IC.

Comparator output voltage Vcomp is a voltage signal of the output waveform of the internal comparator of the control IC. The internal comparator outputs an L level when the CS terminal voltage VCS is lower than reference voltage V3, and outputs an H level when the CS terminal voltage VCS exceeds the reference voltage V3.

A time Tp is a time needed until the CS terminal voltage VCS reaches the level of the reference voltage V3. In this embodiment, the length of the ON time of the switching element is set to the peak current reaching time, as heretofore described, but it is also possible to use Tp shown in FIG. 7 as a peak current reaching time needed until the drain current of the MOSFET 17 reaches its peak value. As both peak current reaching times relate to a delay time, they slightly differ from a peak current reaching time in a strict sense, but it is possible to neglect the effect of the difference in the way of using the peak current reaching time in the invention (the ½ time detection or A time detection). Hereafter, the time Tp will be used in the sense of either the Tp shown in FIG. 7 or the length of the ON time of the switching element.

Voltage VCS/2 is the CS terminal voltage for a time of half the ON time needed when the MOSFET 17 is turned on (hereafter called a time Tp/2). Also, difference voltage ΔVCS is a difference value between the reference voltage V3 or reference voltage Vc shown in FIG. 14 (the reference voltage V3 and the reference voltage Vc are equal) and the voltage VCS/2.

The delay time Tdly, as heretofore described, is a time needed for delay from the CS terminal voltage VCS exceeding the reference voltage V3 until the switching of the MOSFET 17 is turned off and the CS terminal voltage VCS reaches the L level.

Next, a description will be given of an operation of the first embodiment. FIG. 8 is a diagram for illustrating the operation of the first embodiment. FIG. 8 shows a relationship between the time Tp and delay time Tdly in a current discontinuation mode, wherein the vertical axis is current, and the horizontal axis is time.

In the current discontinuation mode or a critical mode, the drain current of the MOSFET 17 forms the kind of triangular shape shown in FIG. 8. Because of this, when the switching element is turned off owing to the OCP function, the drain current for the time Tp/2 is half the overcurrent detection level (there is no difference depending on the time Tp/2). Therefore, the difference voltage ΔVCS also becomes a constant value, meaning that the control of the delay time Tdly changes depending on the time Tp.

Meanwhile, the higher the AC input voltage, the steeper the slope of the drain current until the drain current reaches the peak, and the lower the AC input voltage, the gentler the slope of the drain current until the drain current reaches the peak. Also, the smaller the inductance value of the transformer T, the steeper the slope of the drain current until the drain current reaches the peak, and the greater the inductance value, the gentler the slope of the drain current until the drain current reaches the peak.

As opposed to this, the first embodiment is such that the longer the time Tp of the preceding cycle, the longer the delay time Tdly of the present cycle.

Hereafter, a description will be given with examples. In FIG. 8, the respective times Tp of drain currents A1 to A3 are taken to be times Tp1 to Tp3 respectively. Also, the respective delay times Tdly of the drain currents A1 to A3 are taken to be times Tdly1 to Tdly3 respectively.

As Tp1<Tp2<Tp3, it is possible, by setting delay times Tdly1 to Tdly3 so that Tdly1<Tdly2<Tdly3, to make the respective peak current of the drain currents A1 to A3 equal to one another and constant at the constant overcurrent detection level regardless of a change in the AC input voltage or a change in the inductance value.

Figure 9:
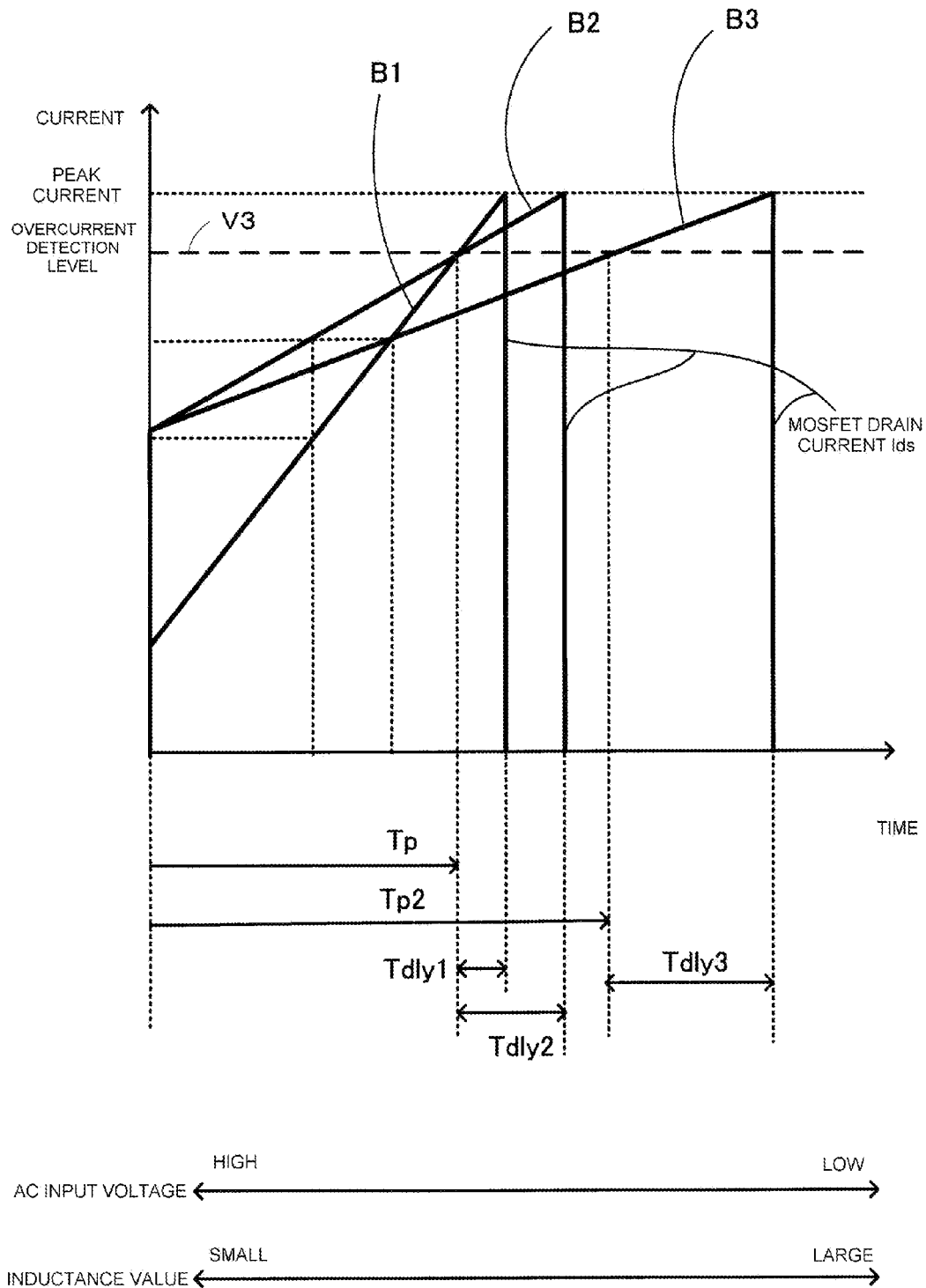
FIG. 9 is a diagram for illustrating an operation of a second embodiment of the invention.

Next, a description will be given of the second embodiment. FIG. 9 is a diagram for illustrating an operation of the second embodiment. FIG. 9 shows a relationship between the time Tp and delay time Tdly in a current continuation mode, wherein the vertical axis is current, and the horizontal axis is time.

The adjustment and control of the delay time Tdly based on the difference voltage ΔVCS in the second embodiment is such that the higher the difference voltage ΔVCS, the shorter the delay time Tdly.

Hereafter, a description will be given with examples. In FIG. 9, firstly, a consideration will be given of drain current B1 and drain current B2. The drain currents B1 and B2 are such that the times Tp are equal to each other, but as the current slopes are different from each other, the drain currents are different for the Tp/2. Because of this, the difference voltage ΔVCS of the drain current B1 and the difference voltage ΔVCS of the drain current B2 also differ. That is, as the slope of the drain current 91 is steeper than the slope of the drain current B2, the difference voltage ΔVCS of the drain current 91 of the present cycle is higher.

In this case, the delay time Tdly1 in the drain current 91 with the higher difference voltage ΔVCS is made shorter than the delay time Tdly2 in the drain current 92 with the lower difference voltage ΔVCS, thus suppressing the peak current of the drain current B1, and making it equal to the peak current of the drain current 92.

Next, a consideration will be given of the drain current 92 and drain current 93.

The drain currents 92 and 93 are such that the drain currents and difference voltages ΔVCS for the Tp/2 are equal, but as the current slopes are different from each other, the times Tp are different. In this case, the delay time Tdly3 in the drain current B3 with the longer time Tp (Tp2) is made longer than the delay time Tdly2 in the drain current 92 with the shorter time Tp, thus raising the peak current of the drain current 93, and making it equal to the peak current of the drain current 92.

By carrying out the heretofore described kind of control, it is possible, regardless of a change in AC input voltage or a change in inductance value, to make the respective peak current of the drain currents B1 to B3 equal to one another and constant with respect to the constant overcurrent detection level.

Figure 10:
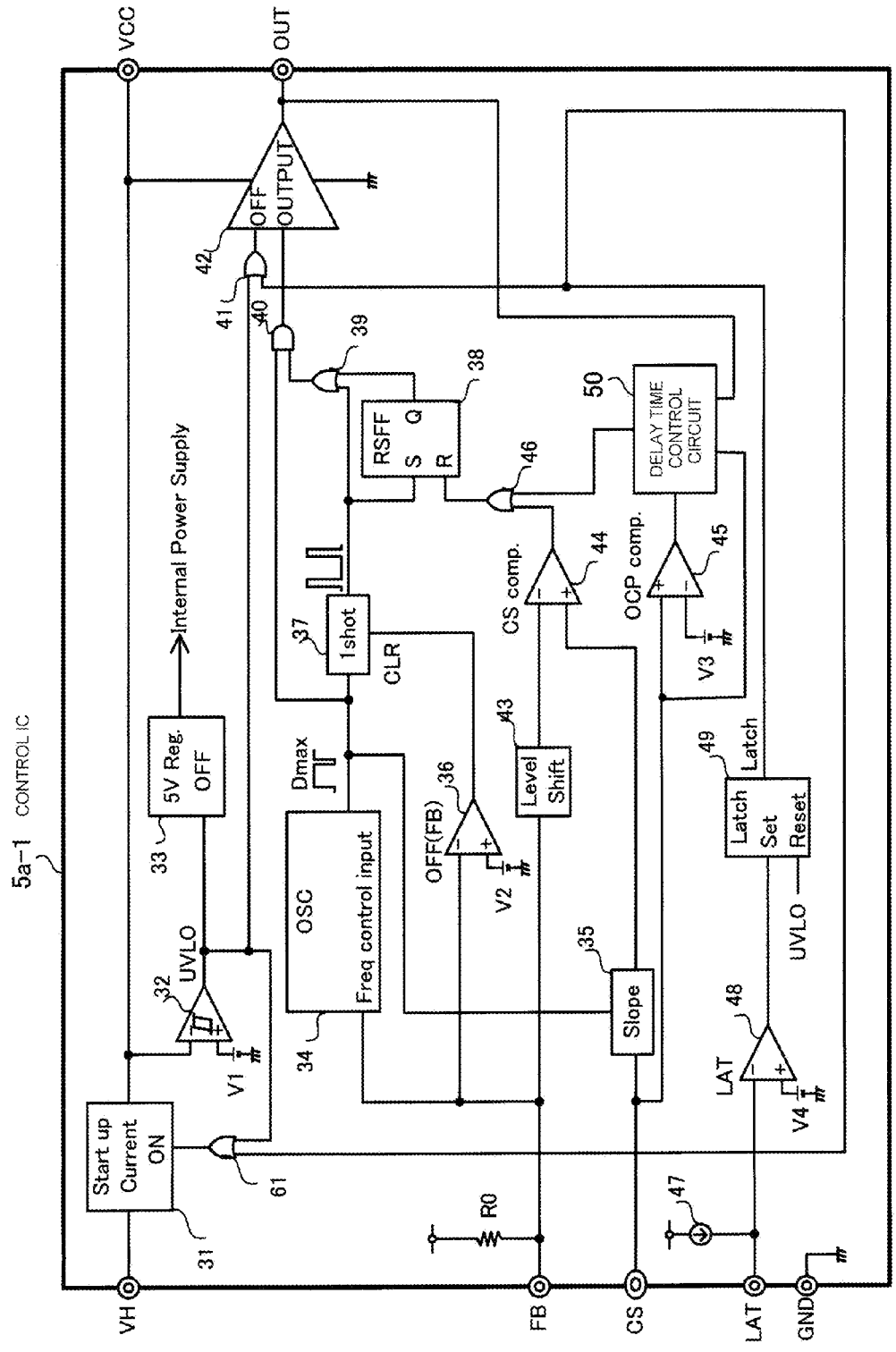
FIG. 10 is a diagram showing a circuit block configuration of a control IC.

Next, a description will be given of a circuit block configuration of a control IC of the second embodiment which carries out a control. FIG. 10 is a diagram showing the circuit block configuration of the control IC.

In a control IC 5a-1, a start-up circuit 31 supplies current to the VCC terminal from the VH terminal when starting up, and when the AC input 1 is applied to the flyback power supply, the current flows from the VH terminal through the start-up circuit 31 to the VCC terminal in the control IC 5a-1. By so doing, the capacitor 13 externally connected to the VCC terminal is charged, and the voltage of the capacitor 13 rises.

A low voltage malfunction prevention circuit (UVLO) 32 is connected to the VCC terminal and a reference supply V1. In the low voltage malfunction prevention circuit 32, when the voltage of the VCC becomes equal to or higher than that of the reference supply V1, an UVLO signal which is the output of the low voltage malfunction prevention circuit 32 becomes the low (L) level, an internal power supply (5VReg.) 33 starts up, and the supply of power to each circuit in the control IC 5a-1 is carried out, as opposed to which, while the voltage of the VCC terminal is being low, the UVLO signal becomes the high (H) level, and the operation of the control IC 5a-1 is stopped.

An oscillator (OSC) 34, being connected to the FB terminal, has a built-in frequency modulation function in order to reduce electromagnetic interference (EMI) noise generated by the switching operation of the MOSFET 17.

The oscillator 34, which determines the frequency of the switching of the MOSFET 17 by the control IC 5a-1, also has the function of lowering oscillation frequency when load is light, apart from the frequency modulation function, and outputs an oscillation signal (a duty max signal) Dmax.

The oscillation signal Dmax is a signal which is at the H level for a long time and at the L level for a short time in every cycle, the cycle is the switching cycle of the switching power supply, and the ratio of the cycle to the time at the H level during the cycle gives the maximum time ratio (duty max) of the switching power supply. Also, a slope compensation circuit 35, being connected to the CS terminal, includes the function of preventing a sub-harmonic oscillation to be described hereafter.

The input terminal of an FB comparator 36 is connected to the FB terminal and a reference supply V2. When the voltage of the FB terminal is lower than that of the reference supply V2, it is determined that load power is low, and a clear signal CLR is output from the FB comparator 36 to a one-shot circuit 37 in the subsequent stage, thus stopping the switching operation. Also, when the voltage of the FB terminal is higher than that of the reference supply V2, the switching operation is started, thereby realizing a burst operation.

The one-shot circuit 37 generates a set pulse which is triggered when the oscillation signal Dmax of the oscillator 34 rises and output to an RS flip-flop 38 in the subsequent stage. Moreover this set pulse is also a blanking signal which prevents MOSFET carrying out a turn-off accidentally by the noise which occurs in CS terminal at the time of the turn-off of MOSFET. Also, the one-shot circuit 37, while the clear signal CLR of the H level is being input, does not output the set pulse to the RS flip-flop 38.

The RS flip-flop 38 generates a PWM signal together with an OR gate 39 and AND gate 40. That is, the OR gate 39 generates, from the respective output signals of the one-shot circuit 37 and RS flip-flop 38 being input, a blanking signal which is a sum (OR) signal of the two output signals.

The output signal of OR gate 39 basically becomes the PWM signal, but furthermore, the maximum duty of the PWM signal is determined by the AND gate 40 based on the oscillation signal Dmax of the oscillator 34.

The UVLO signal output from the low voltage malfunction prevention circuit 32 is supplied to a drive circuit (OUTPUT) 42 via the OR gate 41, and the gate of the MOSFET 17 is switch controlled by a switch signal Sout output from the drive circuit 42 via the OUT terminal.

That is, when the voltage of the VCC terminal is low and the UVLO signal is at the H level, the output of the drive circuit 42 is turned off (a signal which turns off the MOSFET 17 is output).

Conversely, when the voltage of the VCC terminal is high and the UVLO signal is at the L level, and when the output signal of the latch circuit 49 is at the L level, the drive circuit 42 switch controls the gate of the MOSFET 17 in accordance with the output signal of the AND gate 40.

A level-shift circuit 43 has the function of level shifting the voltage of the FB terminal to a voltage range in which the voltage can be input into a CS comparator 44, and the output signal of the level-shift circuit 43 is supplied to the inverting input terminal (−) of the CS comparator 44.

The output signal of the slope compensation circuit 35 is supplied to the non-inverting input terminal (+) of the CS comparator 44. Power supply voltage Vcc is connected to the FB terminal via a resistor R0, and the resistor 90 is the load resistance of a phototransistor configuring the photocoupler 21. Because of this, the applied voltage to load 25 which connected to the switching power supply device is detected by the voltage drop from the internal power supply caused by the resistor R0.

The CS comparator 44, in which the slope compensated voltage of the CS terminal and the level shifted voltage of the FB terminal are compared, determines the OFF timing of the MOSFET 17.

Also, an OCP comparator 45 which determines the overcurrent detection level of the MOSFET 17 is connected to the CS terminal of the control IC 5a-1. The OCR comparator 45, the non-inverting input terminal (+) of which is connected to the CS terminal, and the inverting input terminal (−) of which is connected to the reference supply V3, determines the overcurrent detection level of the MOSFET 17.

Further, an OFF signal from the CS comparator 44 and an OFF signal from the OCP comparator 45 after the delay time has been adjusted by the delay time control circuit 50 are both supplied to the reset terminal of the RS flip-flop 38 via the OR gate 46.

Current is supplied to the thermistor 9 from a current source 47 via the LAT terminal. An LAT comparator 48, being connected to the LAT terminal and a reference supply V4, when detecting that the voltage of the LAT terminal (that is, the voltage of the thermistor 9) has lowered to the voltage of the reference supply V4 or lower, the control IC judges that it is a heating condition, and outputs a set signal to a latch circuit 49.

The latch circuit 49, on receiving the set signal of the LAT comparator 48, outputs a latch signal Latch of the H level to the OR gate 41 and an OR gate 61. By so doing, the drive circuit 42 is turned off, and the start-up circuit 31 is turned on. Also, the UVLO signal of the low voltage malfunction prevention circuit 32 has been supplied to the reset terminal of the latch circuit 49, and when the potential of the VCC terminal lowers, a latch condition is released.

When the internal power supply 33 starts up, and power is supplied to the internal circuits, voltage is applied to the phototransistor configuring the photocoupler 21 via the resistor R0 and FB terminal, and the voltage of the FB terminal rises.

When the voltage signal of the FB terminal becomes equal to or higher than a certain voltage, the oscillation signal Dmax is output from the oscillator 34, and a set pulse, by being triggered when the oscillation signal Dmax rises, is output to the RS flip-flop 38 from the one-shot circuit 37.

The set pulse is input into the OR gate 39 together with the output signal of the RS flip-flop 38, thus generating the blanking signal. Further, the blanking signal is output, as the PWM signal, from the OUT terminal to the gate terminal of the MOSFET 17 through the AND gate 40 and drive circuit 42, and becomes the switch signal Sout, which drives the MOSFET 17.

By so doing, the MOSFET 17 is turned on when the oscillation signal Dmax rises. The reason that the output signal of the RS flip-flop 38 and the set pulse from the one-shot circuit 37 are added (ORed) together is for preventing RS flip-flop 38 being reset by the noise which occurs in CS terminal at the time of the turn-off of MOSFET, and MOSFET 17 carrying our turn-off immediately after turn-on.

As the drain current Ids flows through the sense resistor 12 when the MOSFET 17 is turned on, the voltage of the CS terminal of the control IC 5a-1 rises. Further, when the slope compensated voltage of the CS terminal of the control IC 5a-1 reaches the voltage wherein the voltage of the FB terminal is level shifted by the level-shift circuit 43, a reset signal is output from the CS comparator 44 via the OR gate 46 to the RS flip-flop 38.

By the RS flip-flop 38 being reset, the output of the OR gate 39 becomes the L level (in a normal operation, the set pulse from the one-shot circuit 37 becomes the L level at this point), as a result of which the output of the AND gate 40 also becomes the L level, meaning that the MOSFET 17 is turned off by the switch signal Sout.

Also, even when the load 25 connected to the switching power supply device becomes extremely heavy, and the voltage fed back to the FB terminal of the control IC 5a-1 falls outside a control range (on a high voltage side), it is possible to turn off the MOSFET 17 when the voltage of the CS terminal becomes equal to or higher than the reference voltage V3 by the voltage of the CS terminal being compared with the constant reference voltage V3 by the OCP comparator 45.

Before the voltage to which the voltage of the FB terminal is level shifted is compared with the voltage of the CS terminal by the CS comparator 44, slope compensation wherein slope compensation voltage proportional to the ON width of the MOSFET 17 is added to the voltage of the CS terminal has been performed by the slope compensation circuit 35.

In general, in the event that the MOSFET 17 operates in a steady condition, the current flowing through the MOSFET 17 at the beginning of each switching cycle is constant. However, when the duty (On time ratio=On width/switching cycle) is excessively large, the current is not constant, and the condition of the current flowing through the MOSFET 17 fluctuates in every switching cycle. When this phenomenon occurs, the current flowing through the MOSFET 17 attains a condition in which a low-frequency signal is superimposed on a switching frequency signal.

An oscillation at this kind of low frequency is known as a sub-harmonic oscillation, but the sub-harmonic oscillation has conditions for its occurrence. It is possible to prevent the sub-harmonic oscillation in such a way that these conditions are not met owing to the slope compensation of superimposing a monotonically increasing signal on the voltage of the CS terminal.

The delay time control circuit 50 including the function of the control circuit 5-1 of FIG. 1 is added to the output stage of the OCP comparator 45. The output signal of the OCP comparator 45, the voltage of the CS terminal, and the voltage of the OUT terminal are input into the delay time control circuit 50, and the output of the delay time control circuit 50 is input into one input terminal of the OR gate 46.

Figure 11:
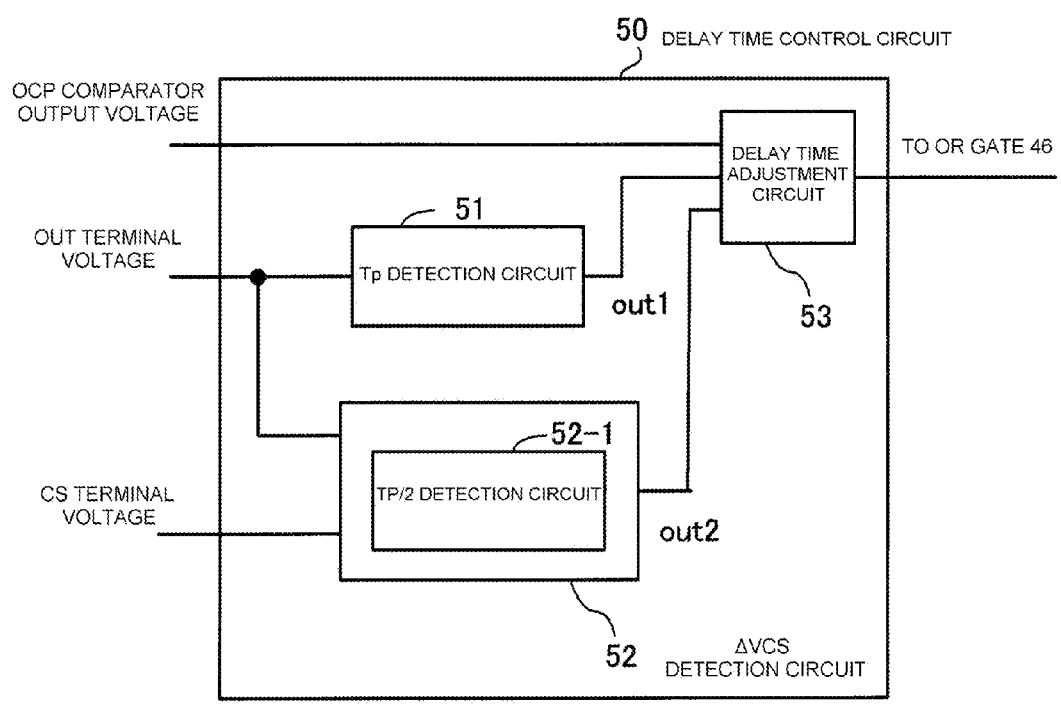
FIG. 11 is a diagram showing a block configuration of a delay time control circuit.

FIG. 11 is a diagram showing a block configuration of the delay time control circuit. The delay time control circuit 50 includes a Tp detection circuit 51, a ΔVCS detection circuit 52, and a delay time adjustment circuit 53.

The Tp detection circuit 51 generates a signal representing the length of the peak current reaching time Tp needed until current flowing through the switching element reaches its peak value. The ΔVCS detection circuit 52 includes a Tp/2 detection circuit 52-1. The Tp/2 detection circuit 52-1 detects a time of ½ the ON time of the preceding cycle of the MOSFET 17. The ΔVCS detection circuit 52 detects the difference voltage ΔVCS between the reference voltage and the voltage (VCS/2) of the CS terminal when the ½ time is detected. The delay time adjustment circuit 53 adjusts the time Tdly.

Figure 12:
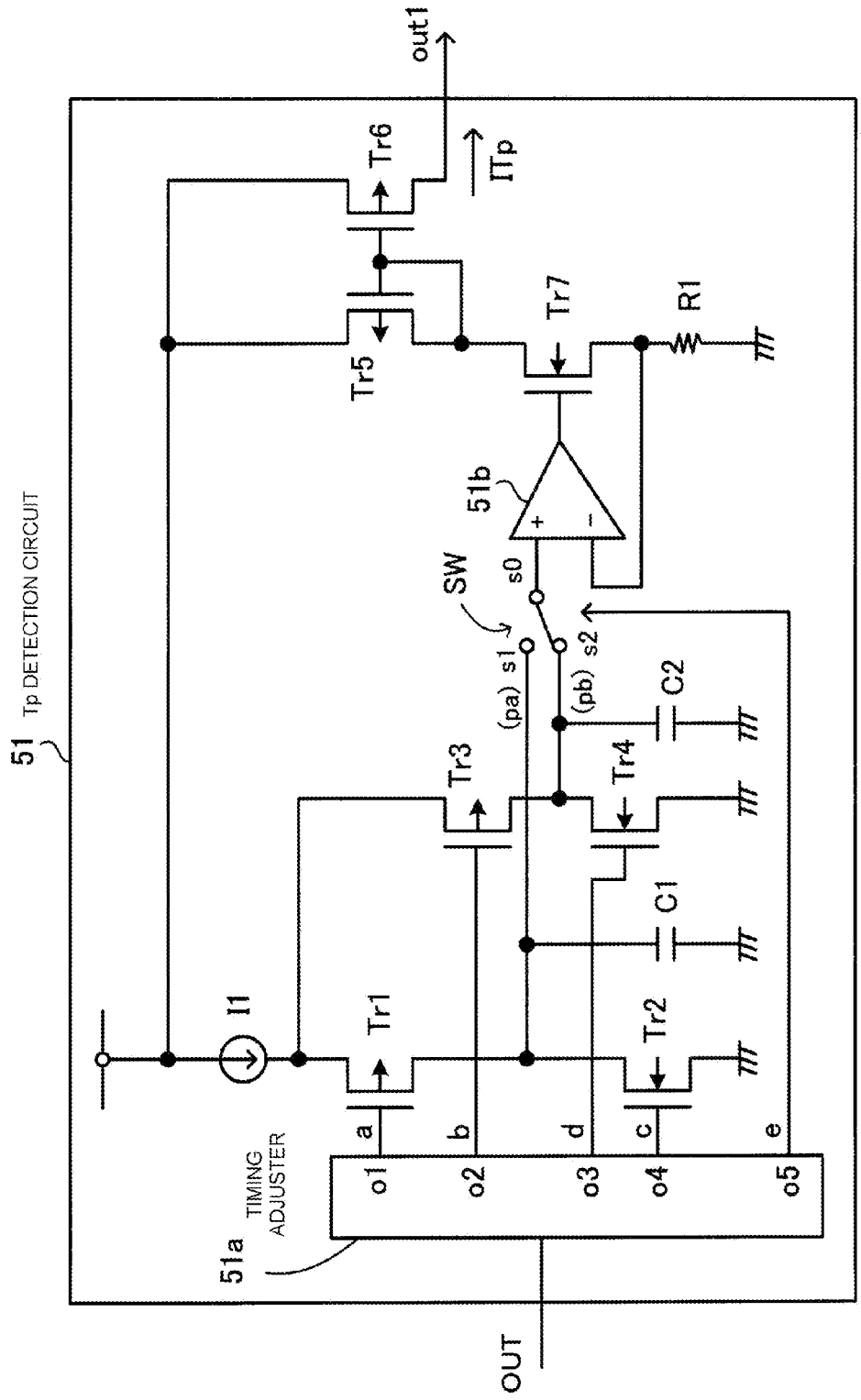
FIG. 12 is a diagram showing an example of a configuration of a Tp detection circuit.

Next, a description will be given of a configuration and operation of each circuit. FIG. 12 is a diagram showing an example of a configuration of the Tp detection circuit. The Tp detection circuit 51 includes a timing adjuster 51a, an operational amplifier 51b, a switch SW, a constant current source I1, P-channel MOSFET transistors Tr1, Tr3, Tr5, and Tr6, N-channel MOSFET transistors Tr2, Tr4, and Tr7, capacitors C1 and C2, and a resistor R1.

The relation of connection of the individual components is such that the input terminal of the timing adjuster 51a is connected to an OUT terminal (OUT) of the control IC 5a-1. The timing adjuster 51a has output terminals o1 to o5. The output terminal o1 is connected to the gate of the transistor Tr1, the output terminal o2 is connected to the gate of the transistor Tr3, and the output terminal o3 is connected to the gate of the transistor Tr4. The output terminal o4 is connected to the gate of the transistor Tr2, and the output terminal o5 is connected to the switch control terminal (not shown) of the switch SW.

The input terminal of the constant current source I1 is connected to the power supply and the sources of the transistors Tr5 and Tr6. The output terminal of the constant current source I1 is connected to the sources f the transistors Tr1 and Tr3. The drain of the transistor Tr1 is connected to the drain of the transistor Tr2, one end of the capacitor C1, and a terminal 51 of the switch SW. The source of the transistor Tr2 and the other end of the capacitor C1 are connected to GND.

The drain of the transistor Tr3 is connected to the drain of the transistor Tr4, one end of the capacitor C2, and a terminal s2 of the switch SW. The source of the transistor Tr4 and the other end of the capacitor C2 are connected to the GND.

The input terminal (+) of the operational amplifier 51b is connected to a terminal s0 of the switch SW, the input terminal (−) of the operational amplifier 51b is connected to the source of the transistor Tr7 and one end of the resistor R1, and the output terminal of the operational amplifier 51b is connected to the gate of the transistor Tr7. The other end of the resistor R1 is connected to the GND.

The drain of the transistor Tr7 is connected to the drain and gate of the transistor Tr5 and the gate of the transistor TR6. The drain of the transistor Tr6 is connected to an output terminal outs of the Tp detection circuit 51.

Figure 13:
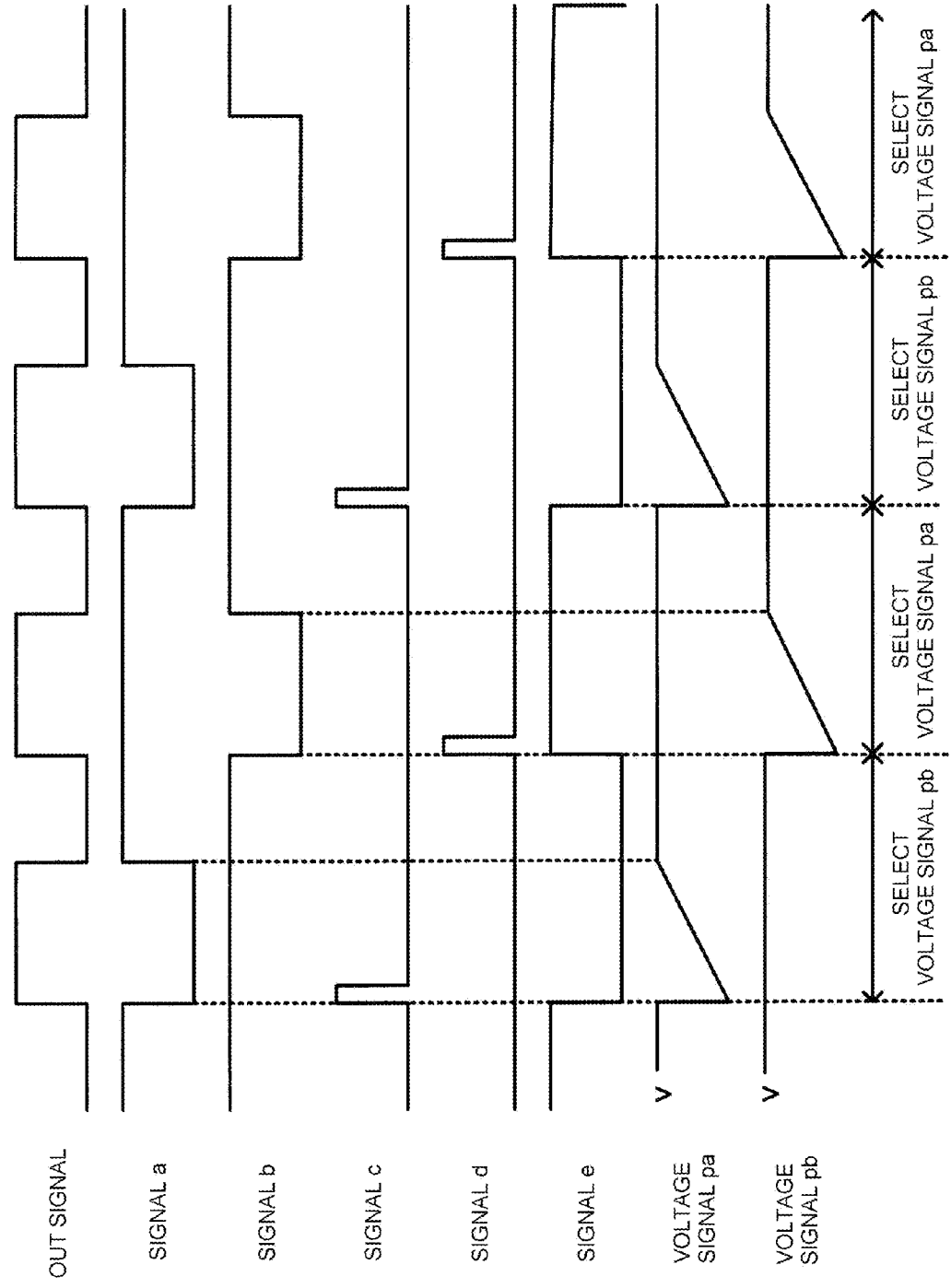
FIG. 13 is a diagram showing timing charts of the Tp detection circuit.

FIG. 13 is a diagram showing timing charts of the Tp detection circuit. A signal a from the output terminal al of the timing adjuster 51a is a charging signal which causes the capacitor C1 to be charged, and a signal b from the output terminal o2 is a charging signal which causes the capacitor C2 to be charged.

Also, a signal c from the output terminal o1 of the timing adjuster 51a is a discharging signal which causes the capacitor C1 to be discharged, and a signal d from the output terminal o3 is a discharging signal which causes the capacitor C2 to be discharged. Furthermore, a signal e from the output terminal o5 of the timing adjuster 51a is a switch control signal.

One cycle of each of the signals a and b corresponds to two cycles of an OUT signal (the output signal of the OUT terminal of the control IC 5a-1), and the signals a and signal b are output so as to be out of phase with each other by one cycle of the OUT signal. Also, the L level width of each of the signals a and b is equal to the H level width of the OUT signal (the ON width of the MOSFET 17).

The signal e is a pulsed signal output when the signal a decays, and the signal d is a pulsed signal output when the signal b decays.

The signal e is a switching control signal of the switch SW, and a voltage signal pa at the terminal s1 is switch selected when the signal e is at the H level, while a voltage signal pb at the terminal s2 is switch selected when the signal e is at the L level.

The transistor Tr2 is turned on by the pulse of the signal c in response to the voltage signal pa, and the capacitor C1 which has been charged is discharged. Subsequently, the transistor Tr1 is turned on at the L level of the signal a, and the capacitor C1 is gradually charged and, when the signal a becomes the H level, maintains a voltage level v at which the signal a has risen until the next pulse of the signal c comes. The signal e becomes the L level in a section (an H section of the OUT signal) in which the voltage signal pa changes, and the switch SW selects and outputs the voltage signal pb at this time.

The transistor Tr4 is turned on by the pulse of the signal d in response to the voltage signal pb, and the capacitor C2 which has been charged is discharged. Subsequently, the transistor Tr3 is turned on at the L level of the signal b, and the capacitor C2 is gradually charged and, when the signal b becomes the H level, maintains voltage v at which the signal b has risen until the next pulse of the signal d comes. The signal e becomes the H level in a section (an H section of the OUT signal) in which the voltage signal pb changes, and the switch SW selects and outputs the voltage signal pa at this time.

In this way, in the Tp detection circuit 51, the voltage signal pa and voltage signal pb in accordance with the ON time of the OUT signal are peak held once every other cycle. Of the voltage signals pa and pb, held voltage is selected by the switch SW and input into the operational amplifier 51b, and subsequently, voltage/current converted by the operational amplifier 51b. Current ITp in FIG. 12 is current with the voltage signal pa or voltage signal pb in accordance with the ON time of the OUT signal, that is, current proportional to the ON time (the current which flows into the resistor R1 has a value equal to (the input voltage of the input terminal (−) of the operational amplifier 51b)/(the resistance of the resistor R1), and the current is copied by the transistors Tr5 and Tr6 which constitute a current mirror circuit and turns into the current ITp), and the longer the ON time, the larger the current ITp.

Figure 14:
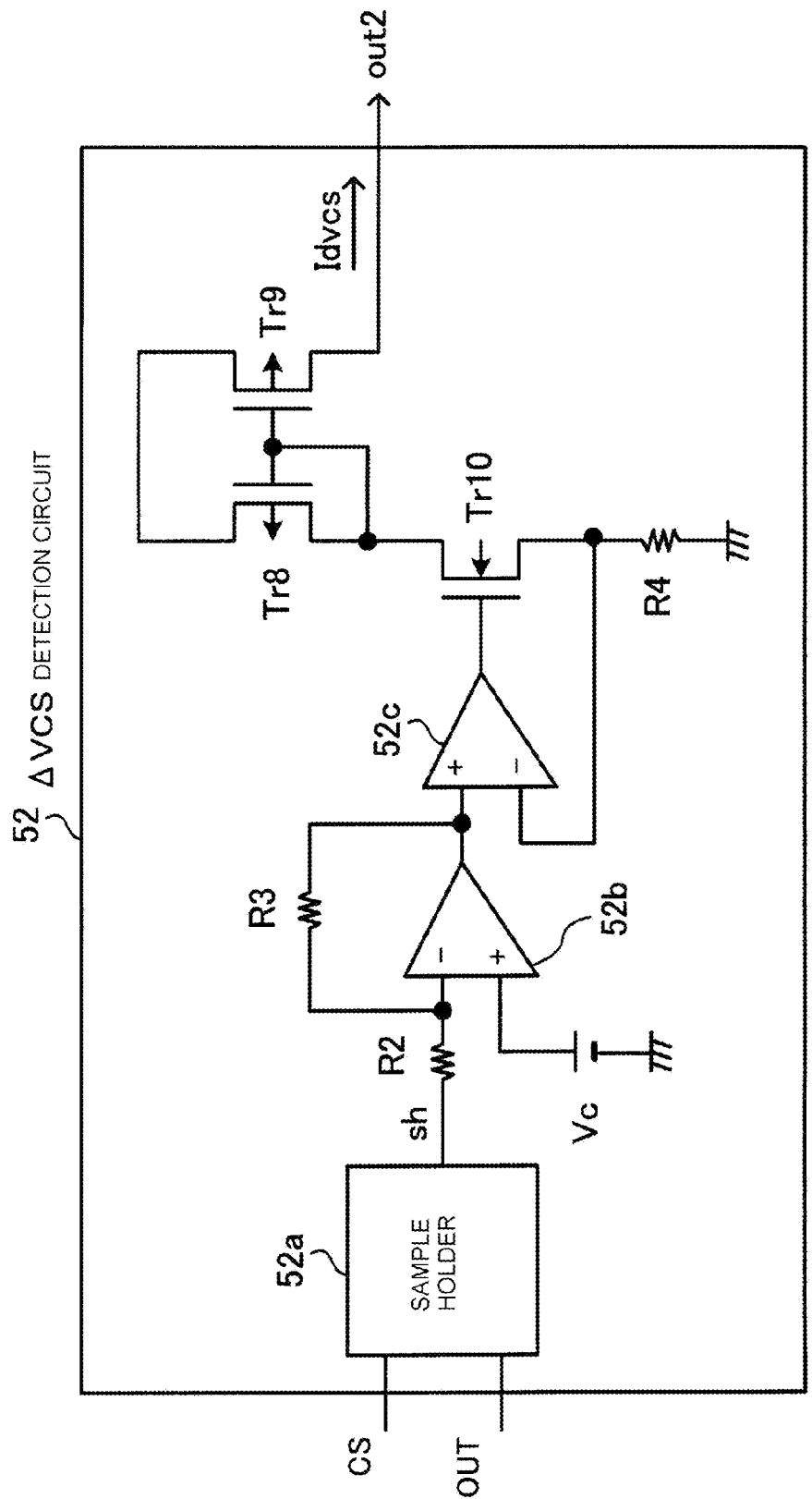
FIG. 14 is a diagram showing an example of a configuration of a ΔVCS detection circuit.

FIG. 14 is a diagram showing an example of a configuration of the ΔVCS detection circuit. The ΔVCS detection circuit 52 includes a sample holder 52a, operational amplifiers 52b and 52c, P-channel MOSFET transistors Tr8 and Tr9, N-channel MOSFET transistors Tr10 to Tr12, resistors R2 to R4, and a reference supply Vc.

The relation of connection of the individual components is such that one input terminal of the sample holder 52a is connected to the CS terminal of the control IC 5a-1, and the other input terminal is connected to the OUT terminal. The output terminal of the sample holder 52a is connected to one end of the resistor R2.

The input terminal (−) of the operational amplifier 52b is connected to the other end of the resistor R2 and one end of the resistor R3, and the input terminal (+) of the operational amplifier 52b is connected to one end of the reference supply Vc, and the other end of the reference supply Vc is connected to the GND.

The input terminal (+) of the operational amplifier 52c is connected to the other end of the resistor R3 and the output terminal of the operational amplifier 52b, and the input terminal (−) of the operational amplifier 52c is connected to the source of the transistor Tr10 and one end of the resistor R4. The other end of the resistor R4 is connected to the GND. The output terminal of the operational amplifier 52c is connected to the gate of the transistor Tr10.

The drain of the transistor Tr10 is connected to the gates of the transistors Tr8 and Tr9 and the drain of the transistor Tr8, and the source of the transistor Tr8 and the source of the transistor Tr9 are connected together. The source of the transistor Tr8 and the source of the transistor Tr9 are connected to the internal power supply.

The drain of the transistor Tr9 is connected to an output terminal of the ΔVCS detection circuit 52.

Figure 15:
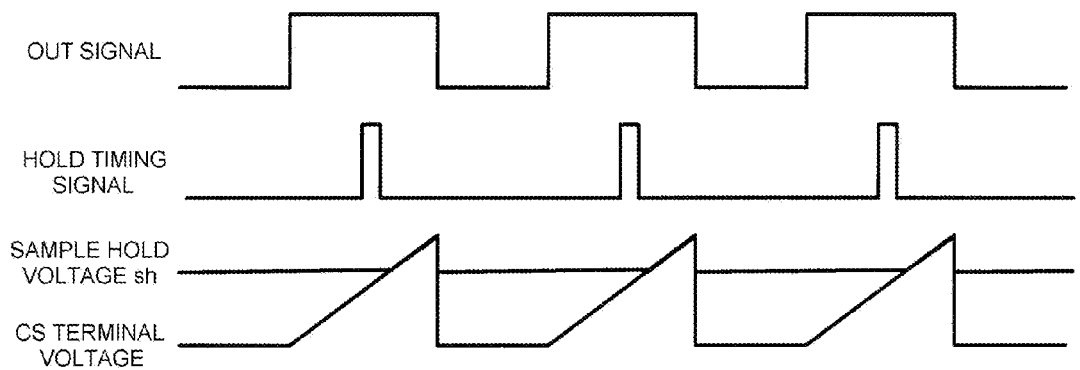
FIG. 15 is a diagram showing timing charts of the ΔVCS detection circuit.

FIG. 15 is a diagram showing timing charts of the ΔVCS detection circuit. A hold timing signal, being a signal generated inside the sample holder 52a, sample holds the voltage of the CS terminal for a time (a time TPp/2) of ½ the ON time of the OUT signal.

The operational amplifier 52b generates the difference voltage ΔVCS by carrying out the differential/inverting amplification of a sample hold voltage sh and the reference voltage from the reference supply Vc. The operational amplifier 52c converts the output voltage (difference voltage ΔVCS) from the operational amplifier 52b into current. Current Idvcs in FIG. 14 is current proportional to the difference voltage ΔVCS, and the higher the difference voltage ΔVCS, the larger the current Idvcs.

Figure 16:
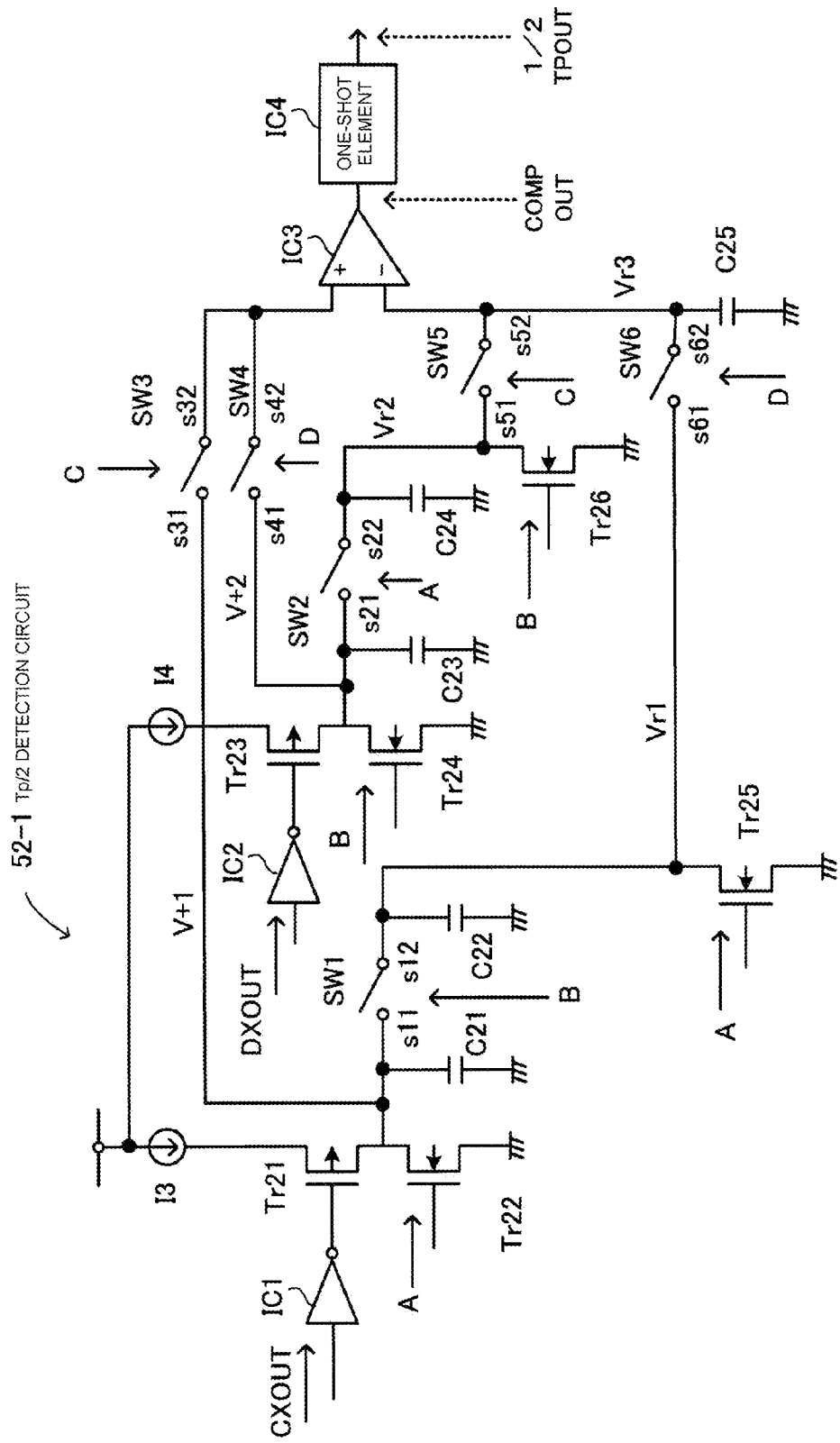
FIG. 16 is a diagram showing an example of a configuration of a Tp/2 detection circuit.

FIG. 16 is a diagram showing an example of a configuration of the Tp/2 detection circuit. The Tp/2 detection circuit 52-1, being included in the sample holder 52a of the ΔVCS detection circuit 52, generates the hold timing signal shown in FIG. 15.

The Tp/2 detection circuit 52-1 includes inverters IC1 and IC2, constant current sources I3 and I4, a comparator IC3, a one-shot element IC4, P-channel MOSFET transistors Tr21 and Tr23, N-channel MOSFET transistors Tr22 and Tr24 to Tr26, capacitors C21 to C24, and switches SW1 to SW6.

Signals A to D, C×OUT, and D×OUT are timing signals output from an unshown timing adjuster included in the Tp/2 detection circuit 52-1, and the timing adjuster can easily be configured by a frequency divider, a logic circuit element, or a one-shot element.

The relation of connection of the individual components is such that the signal C×OUT (the AND signal of the signal C and signal OUT) is input into the input terminal of the inverter IC1, and the output terminal is connected to the gate of the transistor Tr21. The input end of the constant current source I3 is connected to the power supply and the input end of the constant current source I4, and the output end of the constant current source I3 is connected to the source of the transistor Tr21.

The signal A is input into the gate of the transistor Tr22, and the source of the transistor Tr22 is connected to the GND. The drain of the transistor Tr21 is connected to the drain of the transistor Tr22, a terminal s31 of the switch SW3, a terminal s11 of the switch SW1, and one end of the capacitor C21, and the other end of the capacitor C21 is connected to the GND.

A terminal s12 of the switch SW1 is connected to one end of the capacitor C22, the drain of the transistor Tr25, and a terminal s61 of the switch SW6. The other end of the capacitor C22 is connected to the GND, the signal A is input into the gate of the transistor Tr25, and the source of the transistor Tr25 is connected to the GND.

The signal D×OUT (the AND signal of the signal D and signal OUT) is input into the input terminal of the inverter IC2, the output terminal of the inverter IC2 is connected to the gate of the transistor Tr23, and the source of the transistor Tr23 is connected to the output end of the constant current source I4.

The signal B is input into the gate of the transistor Tr24, and the drain of the transistor Tr24 is connected to the drain of the transistor Tr23, a terminal s41 of the switch SW4, a terminal s21 of the switch SW2, and one end of the capacitor C23. The source of the transistor Tr24 and the other end of the capacitor C23 are connected to the GND.

A terminal s32 of the switch SW3 is connected to a terminal s42 of the switch SW4 and the input terminal of the comparator IC3. A terminal s22 of the switch SW2 is connected to one end of the capacitor C24, a terminal s51 of the switch SW5, and the drain of the transistor Tr26.

The signal B is input into the gate of the transistor Tr26, and the other end of the capacitor C24 and the source of the transistor Tr26 are connected to the GND. A terminal s52 of the switch SW5 is connected to the input terminal (−) of the comparator IC3, a terminal s62 of the switch SW6, and one end of the capacitor C25, and the other end of the capacitor C25 is connected to the GND.

The output terminal of the comparator IC3 is connected to the input terminal of the one-shot element IC4, and the output terminal of the one-shot element IC4 is connected to the output terminal of the Tp/2 detection circuit 52-1.

The switch SW1 switches (on/off) based on the signal B, the switch SW2 switches based on the signal A, and the switch SW3 switches based on the signal C. Also, the switch SW4 switches based on the signal D, the switch SW5 switches based on the signal C, and the switch SW6 switches based on the signal D.

Figure 17:
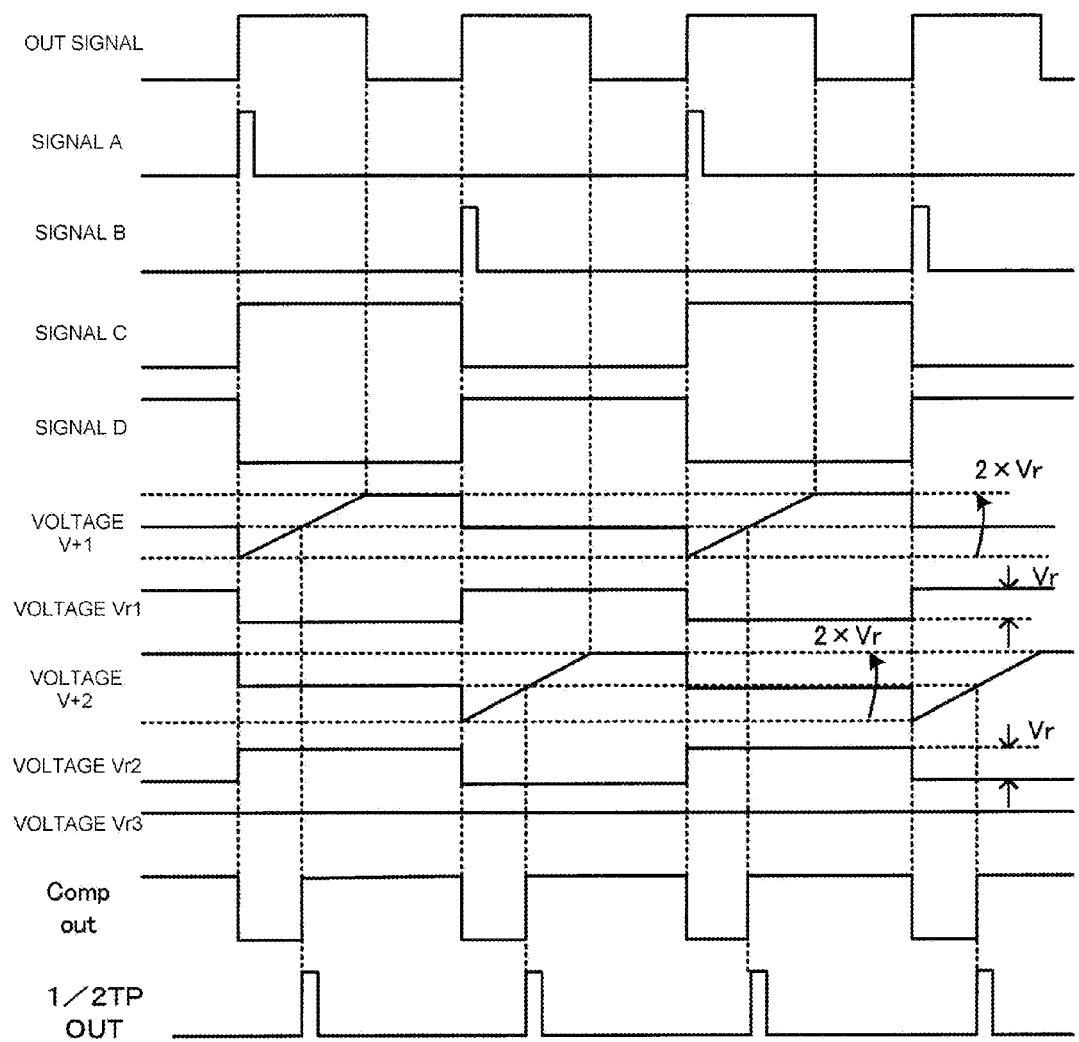
FIG. 17 is a diagram showing timing charts of the Tp/2 detection circuit.

FIG. 17 is a diagram showing timing charts of the Tp/2 detection circuit. Voltage V+1 and voltage V+2, which are voltages wherein constant currents I3 and I4 from the constant current sources I3 and I4 are integrated, are peak held onto the C21 and C23 once every other cycle for the ON time of the OUT signal, thus obtaining signals 2×Vr (which are signals corresponding to the time Tp). Further, the charges of the C21 and C23 are shared with the C22 and C24 which are equal in capacitance to their respective C21 and 023 in the next cycle, thereby obtaining signals Vr for voltages Vr1 and Vr2. The Vr1 and Vr2 are alternately selected by the switches SW5 and SW6, thereby obtaining a signal Vr3. The signal Vr3 gives reference voltage Vr (which corresponds to the time Tp/2). The comparison of the signal Vr3 (reference voltage Vr) and voltage V+1 and the comparison of the signal Vr3 (reference voltage Vr) and voltage V+2 are alternately carried out by the comparator IC3, and when the signal Vr3 (reference voltage Vr) and the signal of the voltage V+1 or voltage V+2 become equal (when it is deemed that the time Tp/2 has elapsed), a signal (comp out) which rises from the L level to the H level is generated. Subsequently, the one-shot element IC4 triggers the rise of the output signal (comp out) of the comparator IC3, and outputs a pulse signal (a hold timing signal) indicating that the time Tp/2 has been detected.

The reason why the Vr can be obtained from the signals 2×Vr by the charges of the C21 and C23 being shared with the C22 and C24 is that when the capacitance of the C21 to C24 are taken to be C21 to C24, C21=C22 and C23=C24. Further, by maintaining I3/C21=I4/C23, the point at which the value of half the voltage obtained by integrating the constant current I3 or I4 with respect to the time Tp and the value wherein the constant current I4 or I3 is integrated are equal is detected, thereby detecting the time Tp/2.

Herein, by it being taken that C22=B×C21 and C24=B× C23 (B is a constant), it is possible to detect a time A×Tp (A is a constant, and 0<A<1). That is, when voltage before the charges of the C21 and C23 are shared with the C22 and C24 is taken to be v0, and voltage after the sharing is taken to be v1
v1=v0×C21/(C21+22)=v0×C23/(C23+C24)=v0/(1+B),
meaning that it is possible to obtain voltage which is A=1/(1+ B) times as high as the voltage obtained by integrating the I3 or I4 with respect to the time Tp. By detecting the point at which this value and the value wherein the constant current I4 or I3 is integrated are equal, it is possible to detect the time A×Tp. By it being taken that 0<B≤∞, it is possible to obtain 0<A<1.

Figure 18:
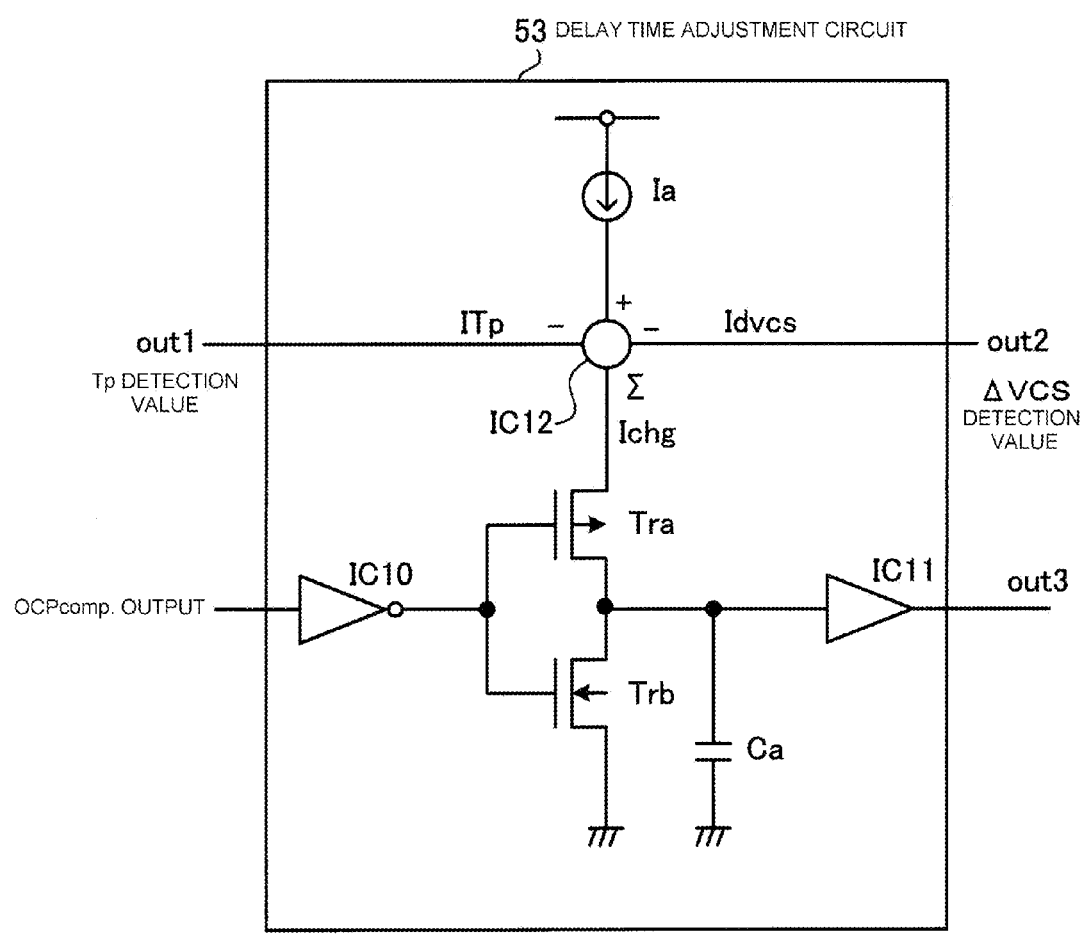
FIG. 18 is a diagram showing an example of a configuration of a delay time adjustment circuit.

FIG. 18 is a diagram showing an example of a configuration of the delay time adjustment circuit. The delay time adjustment circuit 53 includes a constant current source Ia, an inverter IC10, a buffer IC11, a current addition/subtraction circuit IC12, a P-channel MOSFET transistor Tra, an N-channel MOSFET transistor Trb, and a capacitor Ca.

The relation of connection of the individual components is such that one end of the constant current source Ia is connected to the power supply, the other end of the constant current source Ia is connected to a terminal OUT1 (a Tp detection value) of the Tp detection circuit 51, a terminal OUT2 (a ΔVCS detection value) of the ΔVCS detection circuit 52, and the source of the transistor Tra.

The output terminal of the OCR comparator 45 (FIG. 10) is connected to the input terminal of the inverter IC10, and the output terminal of the inverter IC10 is connected to the gates of the transistors Tra and Trb.

The drain of the transistor Tra is connected to the drain of the transistor Trb, one end of the capacitor Ca, and the input terminal of the buffer IC11. The source of the transistor Trb is connected to the GND, the other end of the capacitor Ca is connected to the GND, and the output terminal of the buffer IC11 is connected to an output terminal OUT3 of the delay time adjustment circuit. Also, the output terminal OUT3 is also the output terminal of the delay time control circuit 50.

In the delay time adjustment circuit 53, three charging currents, the current ITp output from the Tp detection circuit 51, the current Idvcs output from the ΔVCS detection circuit 52, and constant current Ia from the constant current source Ia, are synthesized by the current addition/subtraction circuit IC12, thus determining charging current Ichg=Ia-Idvcs-ITp with which the capacitor Ca is charged. Further, the output delay of the OCP comparator 45 is adjusted by adjusting the charging current Ichg with which the capacitor Ca is charged. That is, it is possible to carry out an adjustment such that the time Tp (the ON time of the switching element) is long (short)→the current ITp is large (small)→the charging current Ichg is small (large)→the charging time of the capacitor Ca is long (short)→the delay time is long (short). Also, it is possible to carry out an adjustment such that the difference voltage ΔVCS is high (low)→the current Idyes is small (large)→the charging current Ichg is large (small) the charging time of the capacitor Ca is short (long)→the delay time is short (long). It is possible to configure the IC12 by combining, for example, the current mirror circuit, or the like.

As heretofore described, according to the present technology, as the peak current of the switching element is made constant not only by changing the AC input voltage, but also by using any transformer, it is possible to realize a stable OCR function.

Because of this, there is no more adjustment having heretofore occurred depending on a transformer used, meaning that the number of adjustment parts is reduced, and it is also possible to eliminate adjustment cost. Also, as the accuracy of the peak current by the AC input voltage increases, it is also possible to design at a low rating of parts.

Certain embodiments have heretofore been illustrated, but it is possible to replace the configuration of each unit shown in the embodiments with another configuration having a similar function. Also, any other component or process may be added.

This application is based on, and claims priority to, Japanese Patent Application No. 2012-206301, filed on Sep. 19, 2012. The disclosure of the priority application, in its entirety, including the drawings, claims, and the specification thereof, is incorporated herein by reference.

What is claimed is:

1. A power supply device control circuit which, based on turning-on/turning-off of a switching element, converts rectified alternating current input voltage into direct current output voltage, and supplies it to a load, comprising:
a peak current reaching time detection circuit which detects a peak current reaching time needed until current flowing through the switching element reaches peak current;
a difference voltage detection circuit, including an A time detection circuit which detects an A time which is A (0<A<1) times as long as an ON time of the preceding cycle of the switching element, which detects difference voltage between reference voltage used when detecting overcurrent flowing to the load and a value of a current signal which has detected current flowing through the switching element at the A time; and
a delay time adjustment circuit which, based on at least one of the peak current reaching time and difference voltage, carries out adjustment and control of a delay time occurring until the time when the switching element is turned off after detecting the overcurrent.

2. The power supply device control circuit according to claim 1, wherein
the longer the peak current reaching time of the preceding cycle is, the longer the delay time adjustment circuit makes the delay time.

3. The power supply device control circuit according to claim 1, wherein
the higher the difference voltage of the preceding cycle is, the shorter the delay time adjustment circuit makes the delay time.

4. The power supply device control circuit according to claim 1, wherein
the peak current reaching time detection circuit alternately peak holds a first voltage signal and second voltage signal in accordance with the ON time of the switching element, converts the peak held first and second voltage signals into first charging current of a capacitor, and determines the delay time in accordance with a charging time of the capacitor.

5. The power supply device control circuit according to claim 1, wherein
the difference voltage detection circuit sample holds the current signal using a hold timing signal in a position of the A time corresponding to the ON time of the preceding cycle of the switching element, converts voltage obtained after having carried out the differential/inverting amplification of sample held voltage and the reference voltage into second charging current of a capacitor, and determines the delay time in accordance with a charging time of the capacitor.

6. The power supply device control circuit according to claim 1, wherein A=½.

* * * * *